United States Patent [19]
Easterly et al.

[11] Patent Number: 5,565,912
[45] Date of Patent: Oct. 15, 1996

[54] FILM POSITIONING SYSTEM USING DUAL PERFORATION SENSORS

[75] Inventors: Robert W. Easterly, Churchville; Webster D. Ross, Rochester, both of N.Y.

[73] Assignee: Eastman Kodak Company, Rochester, N.Y.

[21] Appl. No.: 197,778

[22] Filed: Feb. 16, 1994

[51] Int. Cl.$^6$ .............................. H04N 5/253; G03C 1/76; G03B 1/00
[52] U.S. Cl. ...................... 348/96; 352/236; 352/241; 396/284; 396/409; 396/397
[58] Field of Search ................ 348/96, 97, 105, 348/112; 358/487, 488; 352/236, 241, 92; 354/215, 173.11; 355/41

[56] References Cited

U.S. PATENT DOCUMENTS

| | | | |
|---|---|---|---|
| 2,994,783 | 8/1961 | Looschen | 250/219 |
| 3,578,852 | 5/1971 | Aldridge | 352/92 |
| 3,950,652 | 4/1976 | Yamashita | 250/570 |
| 4,140,915 | 2/1979 | Rube et al. | 250/570 |
| 4,417,793 | 11/1983 | Oyokota et al. | 354/21 |
| 4,673,815 | 6/1987 | Fruth et al. | 250/548 |
| 4,727,399 | 2/1988 | Matsumoto | 355/41 |
| 4,906,854 | 3/1990 | Rauh et al. | 250/561 |
| 4,933,713 | 6/1990 | Tsuji et al. | 355/41 |
| 4,980,710 | 12/1990 | Harvey | 354/173.1 |
| 5,055,874 | 10/1991 | Kralles et al. | 355/76 |
| 5,155,596 | 10/1992 | Kurtz et al. | 358/214 |
| 5,194,958 | 3/1993 | Pearman et al. | 348/97 |
| 5,285,235 | 2/1994 | Frick | 355/41 |

FOREIGN PATENT DOCUMENTS

| | | |
|---|---|---|
| 0364991 | 4/1990 | European Pat. Off. ........ G03B 27/62 |
| 0534035 | 3/1993 | European Pat. Off. ........ G03B 27/62 |
| 0576372 | 12/1993 | European Pat. Off. . |
| 3737797 | 5/1989 | Germany . |
| 4092559 | 3/1992 | Japan . |
| 2215551 | of 1989 | United Kingdom . |
| WO91/12557 | 8/1991 | WIPO .............................. G03B 1/60 |
| 92/05469 | 4/1992 | WIPO . |

*Primary Examiner*—Thai Q. Tran
*Assistant Examiner*—Bryan S. Tung
*Attorney, Agent, or Firm*—Gordon M. Stewart

[57] ABSTRACT

A method and apparatus for controlling the positioning of a filmstrip in a film scanning gate using signal states derived from a pair of spaced film sprocket holes or perforation ("perf") sensors on either side of the film scanning gate in conjunction with line scan counts and filmstrip drive, stepper motor half-step counts. The filmstrip is advanced by the stepper motor in a pre-scan operation through the film scanning gate for line scanning the image frames at a low resolution and advanced in the reverse direction back into the film scanning gate for high resolution scanning in a main-scan operation. A line scan array of line scan counts and half-step counts as well as first and second perf arrays of half-step counts and perf sensor states are generated in the pre-scan operation. Image frame borders are located in the pre-scan operation as border line scan counts and correlated in the line scan array to the half step counts to go to in the main-scan. During main-scan, the filmstrip image frames are positioned in the scanning gate by reverse drive of the stepper motor in a coarse and fine alignment process employing the half step counts to go. to and the state transitions in the first and second perf arrays. Filmstrip jams, slips and perforation defects are detected from perf state durations in the perf arrays in relation to the associate half-step counts.

19 Claims, 15 Drawing Sheets

FILM POSITIONING SYSTEM USING DUAL PERFORATION SENSORS

CROSS REFERENCE TO RELATED APPLICATIONS

Reference is made to: U.S. patent application Ser. No. 167,643 filed on Dec. 14, 1993, and entitled "Film Clamp For Flattening Image Frames in a Scanning Gate"; U.S. patent application Ser. No. (197,777) filed Feb. 16, 1994 and entitled "Passive Film Take-up Chamber"; U.S. patent application Ser. No. (197,775) filed Feb. 16, 1994 and entitled "Light Integrating Cavity for a Film Scanner"; (197,774) filed Feb. 16, 1994 and entitled "Film Latent Image Bar Code (LIBC) Reader"; and U.S. patent application Ser. No. (Docket 201,282) filed Feb. 16, 1994 and entitled "Film Scanner With In-Line Dual Scanning Gates".

FIELD OF THE INVENTION

The present invention relates to the transport and alignment of a filmstrip in a film scanner or the like and more particularly to detection and control of the filmstrip position using a pair of spaced film sprocket holes or perforation ("perf") sensors on either side of the film scanning gate.

BACKGROUND OF THE INVENTION

Conversion of analog images into digital data has become widespread for a variety of applications, including storing, manipulating, transmitting and displaying or printing copies of the images. For example, images captured in photographic media are converted to digital data and stored on compact discs for readout and display as a video image, as exemplified by the KODAK® Photo-CD system, or reproduced employing various types of color printers. In order to convert the photographic image into an image frame set of digital line data, the film image frame is transported through a film scanning station past, and illuminated in each scan line with a linear light beam of uniform, diffuse illumination, typically produced by a light integrating cavity or integrator.

The light transmitted through the illuminated scan line of the image frame is typically focused by a lens system onto a linear CCD array, image detector which typically produces three primary color light intensity signals for each image pixel that are digitized and stored. The digitized signal values for each scan line may be formatted to a standard for video recording and display and stored on compact disc or magnetic media or reproduced by a color laser printer or the like. Such film scanners take a variety of forms, and the various common aspects of film image frame digitizing, particularly line illumination and linear CCD array-based digitizers, are described in greater detail in commonly assigned U.S. Pat. No. 5,155,596.

In order to perform line scanning of an image frame of photographic negative filmstrips, it is necessary to provide an accurate film transport mechanism to transport a filmstrip into a scanning gate and hold the image frame flat in alignment with a scanning aperture. Typically, the linear CCD array and scanning light beam are stationary, so that the light beam illuminates a line of the filmstrip image frame, and a line of digitized data is stored. The scanning gate containing the filmstrip image frame is incrementally moved or translated line-by-line by a stepping drive motor until the entire image frame is digitized. Then a new image frame is positioned and flattened for scanning and digitizing. Such a scanning and digitizing system for Photo-CD conversion is embodied in the KODAK® PIW" Model 2400 Photo-CD scanner system marketed by the assignee of this application.

In this film scanner, the scanning plane is vertical and the stationary scanner components are oriented horizontally. An operator introduces the negative filmstrip from the left side into a slot leading to a film track and drive mechanism to position an image frame in a filmstrip scanning gate and the image frame is clamped. A belt driven roller assembly advances the film strip through the filmstrip scanning gate past the stationary scanner components in a first pass or "prescan" operation for scanning the image frames at a low resolution sufficient to provide a video display of the image frame on a monitor for viewing by the operator.

The line pre-scan data outputted from the linear CCD array for each image frame is digitized and sent to an external computer which determines image frame boundary line scan numbers and analyzes the scan line data to derive image density and color balance correction factors. The correction factors and boundary line scan numbers are transmitted back to the scanner computer for use in the high resolution "main-scan".

The scanned and digitized image pixel pre-scan line data is also displayed on a monitor for viewing by the operator. The operator may further adjust the displayed color balance or tone and intensity of the color display while viewing the result of the adjustments until satisfied, whereupon the adjustment factors for that image frame are stored. The orientation of the image may also be stored with the digitized data so that the CD player can rotate the image data 90° for display as a video image at the same aspect that the image was captured by the photographer.

As each image frame is scanned in this first pass, the scanned image frames of the vertically oriented filmstrip are advanced into a stationary take-up chamber. The take-up chamber is provided within the scanner to temporarily hold the filmstrip and isolate it from other apparatus that it could catch on and to keep it clean.

After all image frames are scanned, the trailing end of the filmstrip is advanced in the reverse direction into the filmstrip scanning gate one frame at a time. The filmstrip image frame is clamped and translation stage translates the image frame to the start scan position, and then translates each image frame through the scanning station. The image frame is scanned at high resolution for digitizing the image as a field of data associated to the data derived in the low resolution scan of the same image frame. As the next image frame is advanced into the scanning gate, the filmstrip is transported back out the same slot that it was slipped into for removal by the operator when scanning of all frames is completed. Thus, positioning of the next filmstrip to be scanned must await the complete ejection of the filmstrip being scanned.

In the Model 2400 Photo-CD scanner, a single, quadrature-type, perf sensor is utilized to derive coarse position data. Translation drive motor steps of 0.002 inches (0.0004 cm) per half step are used to interpolate between detected perfs to derive fine position data. The quadrature-type perf sensor is constructed of a pair of optical edge detectors arranged parallel to the direction of motion of the filmstrip in the path occupied by the film perfs. The two detectors are spaced apart a distance that corresponds to a multiple of the leading edge to leading edge distance between successive perfs. The resulting sense signals of each detector are 90° out of phase, unless there is a defect in a perf, e.g. a torn edge or an edge partially or totally obscured by a splice tape or jerking and slippage of the filmstrip in the belt or roller drive.

FIG. 1 shows in a simplified block diagram the layout of the quadrature-type perf sensor 10 located to the left of a scanning aperture 12 in alignment with a film transport path 14. Positioning of the sensor 10 takes into account the ISO standard 35 mm sprocket hole number of eight (8) holes per image frame length (38 mm), the sprocket hole spacing of 4.75 mm and the sprocket hole width of 2.75 mm. The sensor 10 includes the sprocket hole edge detectors 11 and 13 spaced apart by 10.50 mm to effect the 90° out of phase detection of each sprocket hole edge and provide a pair of square wave sense signals that are 90° out of phase.

A drive belt 16 engages the film strip edge (not shown) at the nip and transports it to the right during low-resolution pre-scan under control of motor 19. After each image frame is pre-scanned and advanced into the take-up chamber, the trailing edge of the filmstrip image frame is to the right of the scanning aperture 12.

As the film image frames are pre-scanned, the perf sensor 10 provides the perf edge sense signals to the scanner computer 17. The scanner computer 17 maintains a count of the perf signals and initiates the recording of pre-scan line numbers from each perf edge detect by interpolating the line numbers from stepper drive motor command signals. A perf number vs. pre-scan line number table is generated in the scanner computer. Pre-scan image data is then analyzed by the external computer's frame line detection algorithm to identify frame boundaries. The external computer then passes each frame boundary location to the film scanner computer in terms of pre-scan line number.

The scanner computer 17 also determines the number of the last detected perf where the trailing end of the filmstrip advances to the right of (and results in no output from) the perf sensor 10. The scanner computer 17 provides and counts the stepper motor half step pulse signals and generates a "pseudo-perf" output signal at a multiple count thereof from the preceding detected perf or generated pseudo perf output signal. The pseudo perf output signals are counted as the stepper motor 19 drives the last image frame of the negative filmstrip through the scanning aperture 12. The stepper motor 19 is halted on reaching the set count of 24 pseudo perfs, leaving the filmstrip trailing end just right of the scanning aperture 12. The distance and sprocket hole number depends on the distance from the perf sensor 10 to the center point of the scanning aperture 12 and the nominal rest position of the trailing end under the right end of the drive belt 16. Again, a pseudo perf number vs. pre-scan line number table is stored for the last image frame.

The generation of the pseudo perf signals properly distanced in line scan number from the last detected filmstrip perf is difficult in a number of situations. During processing and the initial making of a set of prints, full length film rolls are spliced end to end. After printing, the film rolls of each customer order are severed at image frame borders into filmstrips of four or five image frames to facilitate packaging with the prints. The severed ends of the filmstrips vary considerably in the location of the first intact sprocket hole from the severed edge.

FIGS. 2 and 3 show examples of the variability encountered in the distance from the severed edges 18 to the nearest sprocket hole 22 at the trailing ends of such filmstrips 20. Also, one or two of the sprocket holes 22 at the edge may be entirely or partly covered with splicing tape 24 as shown in FIGS. 4–7. In FIGS. 2 and 3, the pseudo-perf signal should be generated at the correct time after detecting the last sprocket hole 22. In all other cases, the pseudo perf signal could be generated too late, throwing off the entire set of perf number vs. pre-scan line number tables for the filmstrip during the main-scan.

After all of the image frames are pre-scanned, the drive belt 16 is reversed in direction to drive the filmstrip to the left and used to advance each image frame into the scanning aperture 12 to perform the high-resolution main scan. The control unit utilizes the pre-recorded perf vs. pre-scan line number tables for each image frame to identify the perf closest to the right image frame edge. The drive belt 16 advances the filmstrip to the identified perf, and then the stepping drive motor steps are used to interpolate between perfs to arrive at the frame edge. The filmstrip image frame is clamped in the filmstrip scanning gate to commence the main-scanning as the filmstrip scanning gate is translated in the scanning station.

Problems to be Solved by the Invention

The usage of a single perf sensor on one side of the scanning aperture results in an open loop control system for at least the last three image frames on the negative filmstrip. Moreover, for a negative filmstrip four image frames long, the last three image frames are pre-scanned with the trailing edge beyond the perf sensor. Film slippage and jams that occur during the pre-scan of the second through fourth image frames may be confused with torn perfs and not detectable until the filmstrip has (or should have) arrived back at the perf sensor for main-scan. This causes difficulties for the system if, as the fourth image is aligned for main-scan, a slip occurs. The first three image frame main-scans must be discarded as the image frame alignment is in question.

Another problem that results from using a single perf sensor is the inability to differentiate film slippage from perf defects (i.e.; torn perfs). In addition, the many trailing end, film edge configurations, as shown in FIGS. 2–7, introduce inaccuracy in the transition from real to pseudo perf counts.

SUMMARY OF THE INVENTION

Accordingly, it is one object of the present invention to provide a simple system for keeping track of the perfs in the trailing end of the filmstrip and avoiding the introduction of errors in the tables of perf numbers vs. pre-scan line numbers.

It is a further object of the invention to provide a perf detection and counting system that is insensitive to film perforation defects and trailing filmstrip edge anomalies.

It is yet another object of the invention to detect and differentiate between filmstrip slips and jams in the filmstrip translation and filmstrip sprocket hole defects.

These and other objects of the invention are realized in apparatus for controlling the positioning of the image frames of an elongated filmstrip, having one or more image frames between leading and trailing ends thereof and a series of perforations along the length thereof, in relation to the aperture of a film scanning gate of a scanning station of a film line scanner for deriving sets of pre-scan and main-scan line data of the image frame, the apparatus comprising: a filmstrip drive assembly for contacting and advancing the filmstrip in a forward direction through the scanning gate in a pre-scan operation and in a reverse direction to position image frames in alignment with the scanning gate aperture in a main-scan operation; a stepper drive motor coupled to the filmstrip drive assembly and operable in forward and reverse directions by stepper drive pulses; forward drive means for providing stepper drive pulses and operating the stepper motor in the forward direction for advancing the filmstrip in the forward direction for a predetermined number of stepper drive pulses sufficient to advance the image frames of the filmstrip through the scanning gate as the film scanner derives the pre-scan line data and to position the filmstrip trailing end in a predetermined relation to the filmstrip drive assembly; a first perforation sensor positioned in the film track on one side of the scanning gate and in alignment with filmstrip perforations of the filmstrip advanced in the film track for generating a first perf pulse train of high and low state pulses as the filmstrip leading end is advanced in the forward direction into the scanning gate; and a second perforation sensor positioned in the film track on the opposite side of the scanning gate and in alignment with filmstrip perforations of the filmstrip advanced in the film track for generating a second perf pulse train of high and low state pulses as the filmstrip leading end is advanced in the forward direction past the scanning gate.

In accordance with a another aspect of the invention, the apparatus is employed in the pre-scan operation to develop pre-scan position data related to each perf sensor pulse train and the stepper drive pulses to accurately position the image frames for main-scan operations. During high resolution main-scan, the filmstrip image frames are positioned in the scanning gate by reverse drive of the stepper motor in a coarse and fine alignment process employing the border scan line count to go to while counting the first and second perf state changes and comparing counted perf transitions to the correlated state transitions in the first and second pre-scan arrays. The start main-scan half-step count is compared to the half-step count to go to, derived in reference to the line scan count array from the border scan line count to go to, in the first and second pre-scan arrays to count the state transitions plus one therebetween. The motor is driven in the main-scan direction in the coarse alignment until the state transitions sensed by at least one of the perf sensors corresponds to the derived state transition plus one count. The half-step count corresponding to the plus one transition is noted. Then, in fine alignment, the motor is driven in the pre-scan direction a number of half-steps related to difference between the plus one transition half-step count and the half-step count to go to. The process is repeated to position each image frame in the filmstrip scanning gate.

In a further aspect of the invention filmstrip jams and slips are detected from the first and second perf sensor pulse trains. During pre-scan array accumulation of the half-step counts and perf pre-scan arrays, the perf state transitions are compared to the change in half-step counts between transitions. If a perf state persists beyond a maximum change in half-step counts in both pre-scan arrays, a filmstrip jam is indicated. Filmstrip advancement is halted for operator intervention to clear the jammed filmstrip.

Between pre-scan and main-scan, the perf state durations in the first and second pre-scan arrays are compared to a further maximum change in half-step count corresponding to a normal perf state duration to locate abnormal perf state durations. Slippage is detected when the abnormal perf state durations are located in the first and second pre-scan arrays at approximately the same half-step count. The filmstrip is ejected for inspection and re-insertion to repeat pre-scanning by the operator. A damaged perf is detected when the abnormal perf state durations are located in the first pre-scan array at a first half-step count and in the second pre-scan array at a count that differs by an amount corresponding to the half-steps necessary to advance the damaged perf to the second perf sensor. Damaged perfs are thereby distinguished from slippage, and main-scan is allowed to continue.

Advantageous Effects of the Invention

The problems described above are solved by using a pair of non-quadrature type perf sensors spaced apart by less than two image frame lengths that generate pulse trains that can be compared to one another. One of the sensors is positioned so that the filmstrip trailing end is within its sense field when the filmstrip comes to rest at the end of the pre-scan so that anomalies in the filmstrip trailing end are immaterial and the generation of pseudo-perf signals is unnecessary. The perf sense pulse trains generated by each sensor can then be compared to distinguish film slippage and jams from one another and from torn or notched sprocket hole perfs, so that appropriate action may be taken in each case.

BRIEF DESCRIPTION OF THE DRAWINGS

Other objects, advantages and features of the present invention will become apparent from the following specification when taken in conjunction with the accompanying drawings in which like elements are commonly enumerated and in which.

DESCRIPTION OF THE PREFERRED EMBODIMENTS

Figure 7:
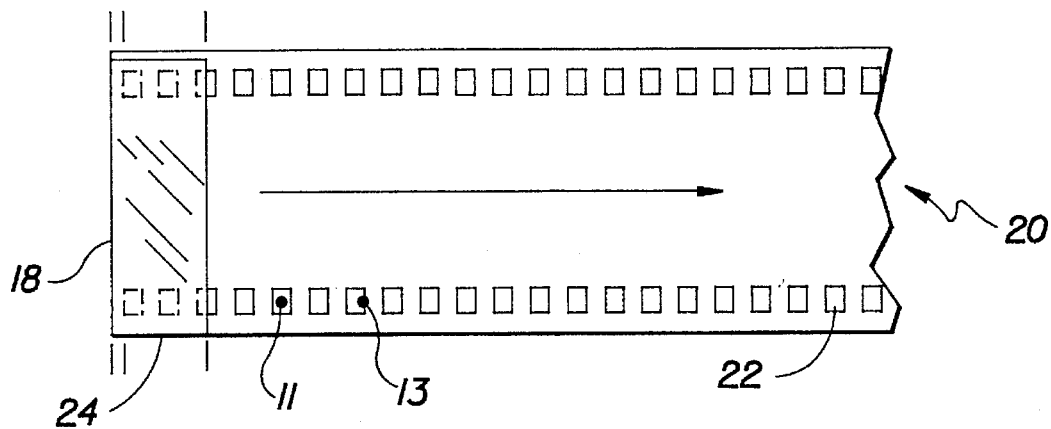
FIG. 7 is an illustration of the "Spliced & Trimmed" trailing edge of a severed negative filmstrip with a partially covered perf.
Figure 9:
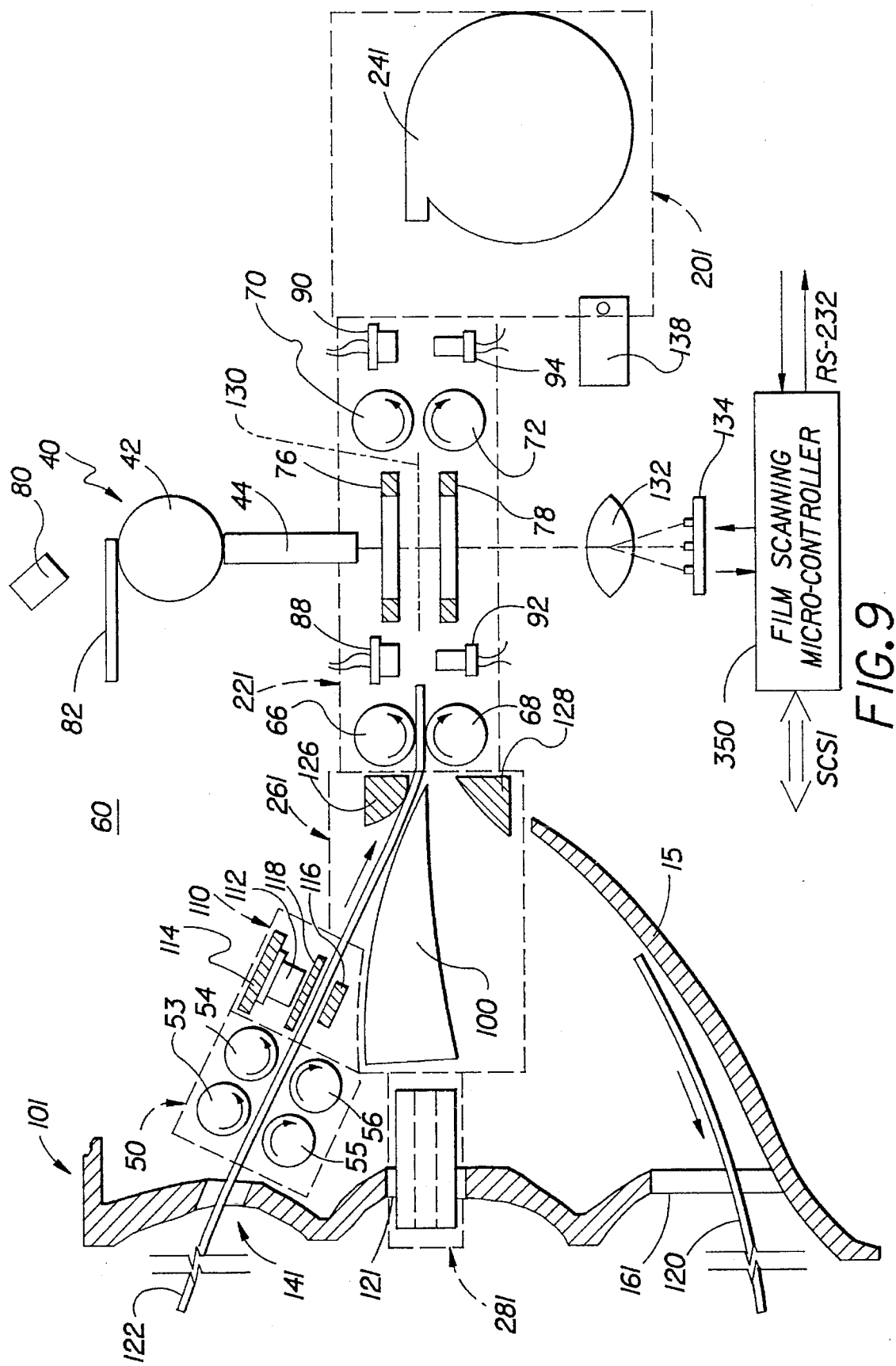
FIG. 9 is a schematic illustration of the components of a film scanner particularly depicting the introduction of the next filmstrip into the filmstrip clamp and scanning gate as a previously introduced and scanned filmstrip is ejected.
Figure 10:
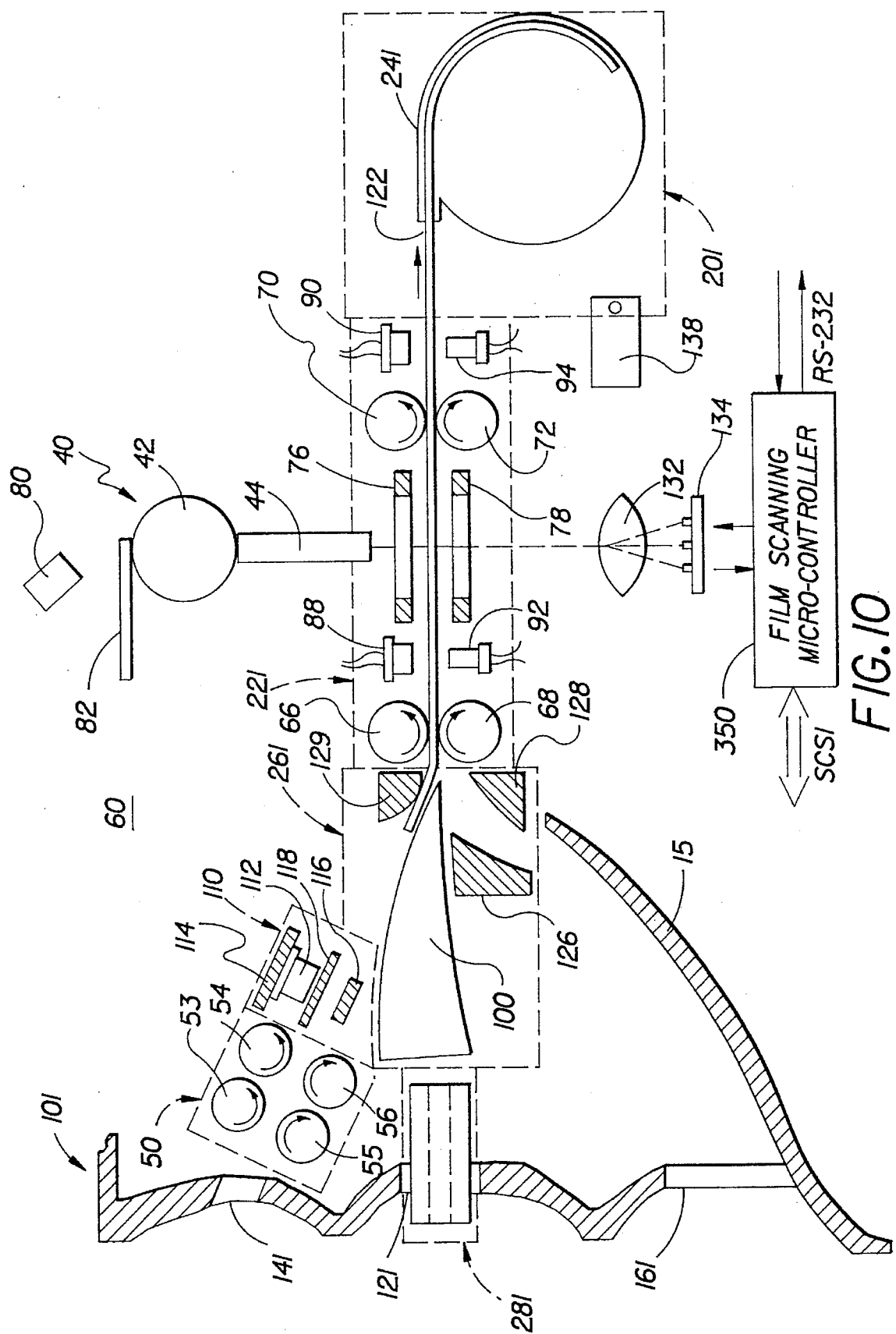
FIG. 10 is a schematic illustration of the continuous advancement of the filmstrip introduced in FIG. 9 into the take-up chamber as the image frames are pre-scanned in the scanning station and the sprocket hole perfs are detected.
Figure 11:
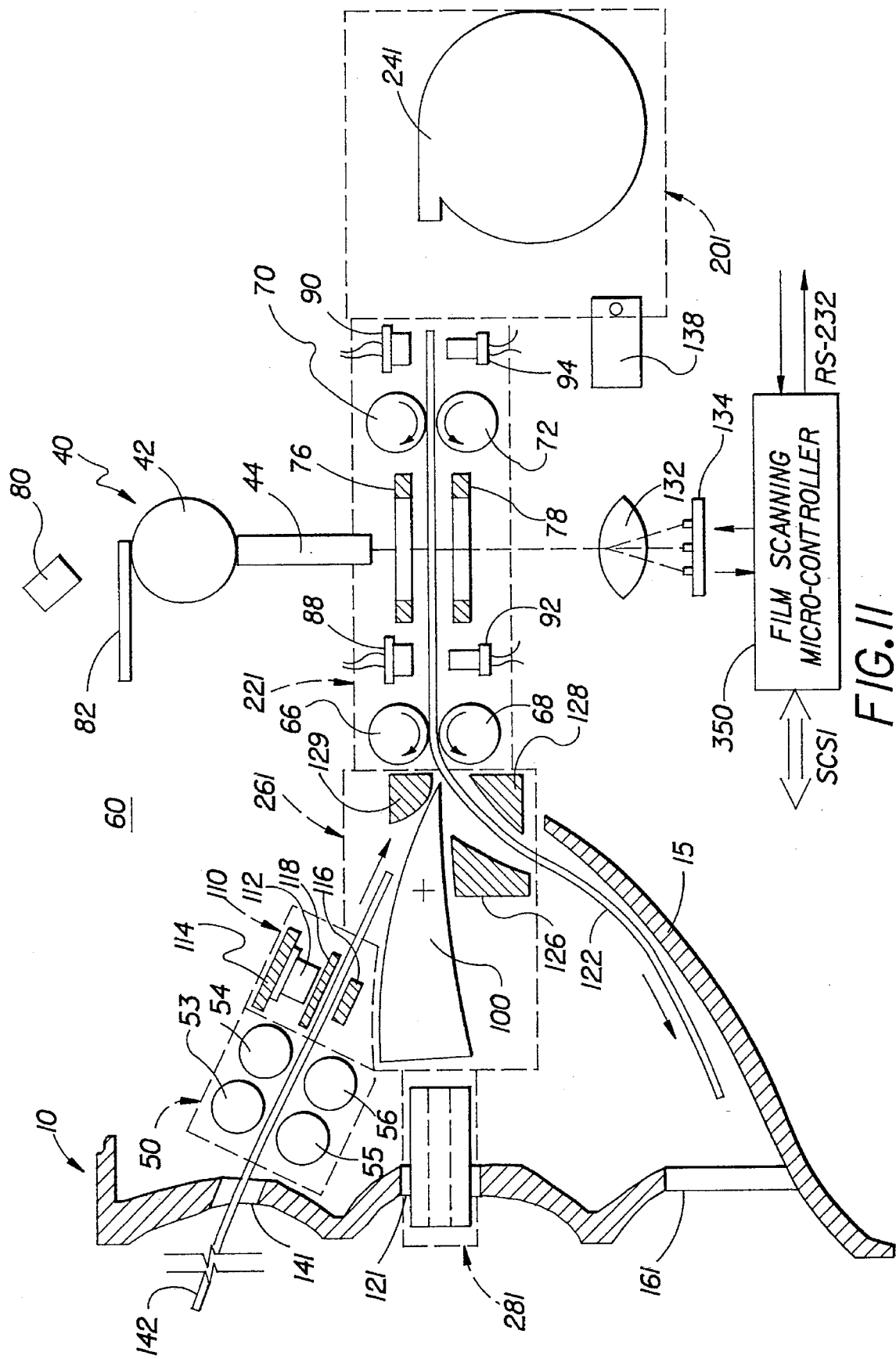
FIG. 11 is a schematic illustration of the withdrawal of the filmstrip advanced in FIG. 10 into the take-up chamber an image frame at a time to position the image frames for the main-scan and the ejection of the filmstrip toward the output slot.
Figure 12:
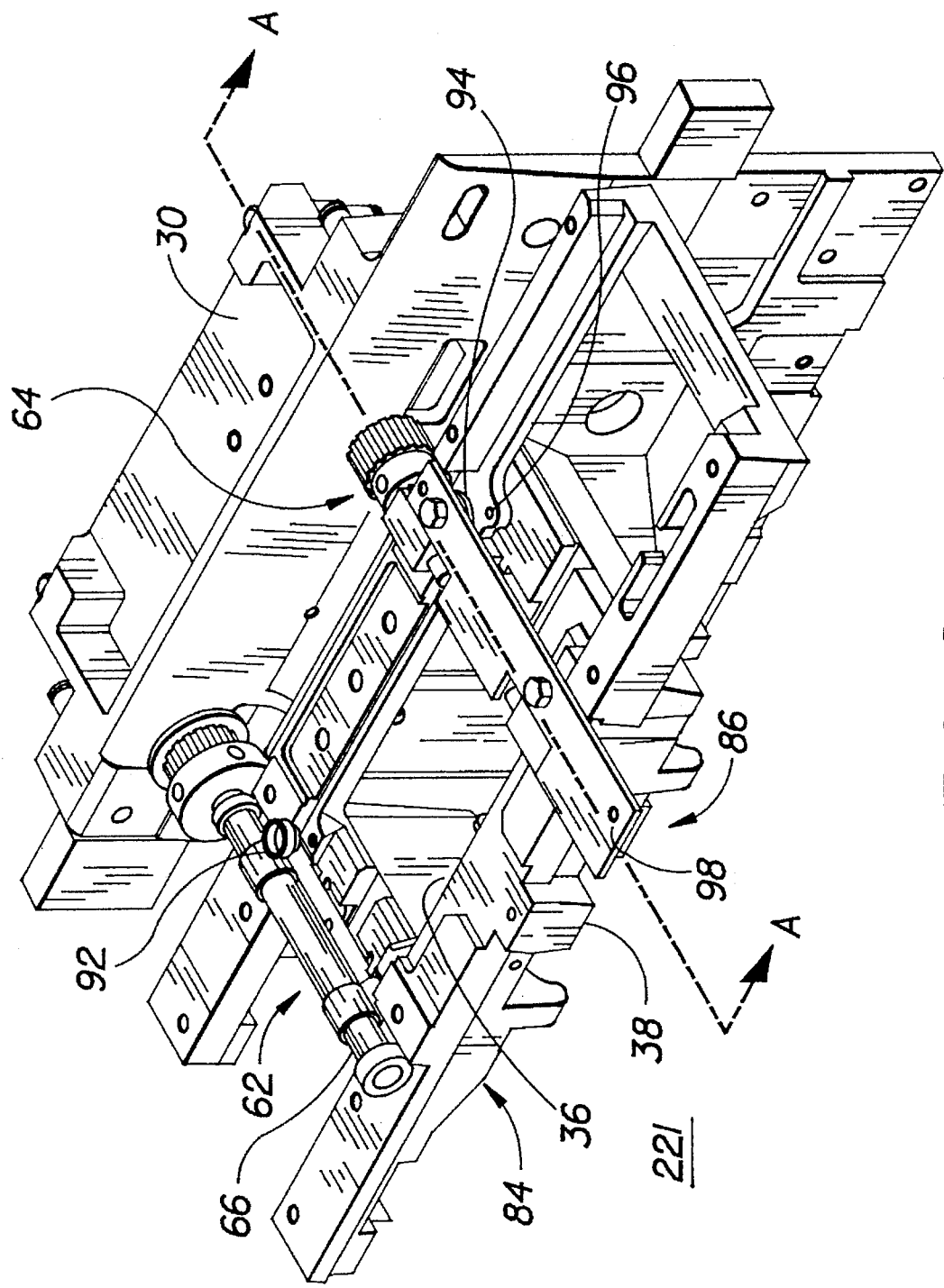
FIG. 12 is an isometric view of certain of the components of a film scanner depicting the perf sensors arranged on either side of the negative filmstrip scanning gate in accordance with the invention.
Figure 13:
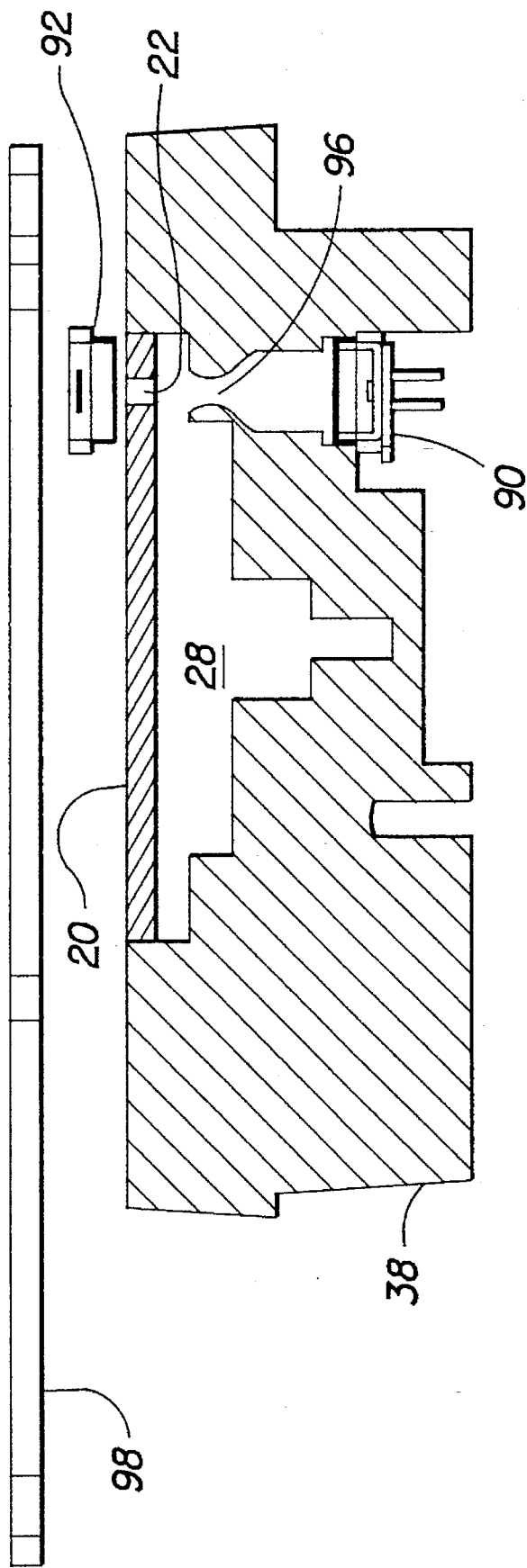
FIG. 13 is a side cross-section view of one of the perf sensors of FIG. 12 showing the arrangement of the sensor components.

The present invention is embodied in a negative filmstrip and slide scanner having a variety of features described in the above-referenced commonly assigned, co-pending applications. A slide and filmstrip transport system, including the scanner computer, is described in the above-referenced U.S. patent application Ser. No. 201,282 employing a negative filmstrip scanning gate and a slide scanning gate, mounted in-line on a scanning gate frame, that may be alternately positioned in the scanning station. FIGS. 9–11 correspond to FIGS. 7–9 of the above-referenced U.S. patent application Ser. No. 201,282 and schematically depict the components of the filmstrip scanner in which the perf sensors and algorithms of the present invention are implemented, FIGS. 12 and 13 depict the perf sensor construction in relation to the negative filmstrip clamp and scanning gate. The modes of operation of the perf sensors of the present invention during negative filmstrip pre-scanning and main-scanning are described in reference to the remaining FIGS. 14–22.

Figure 1:
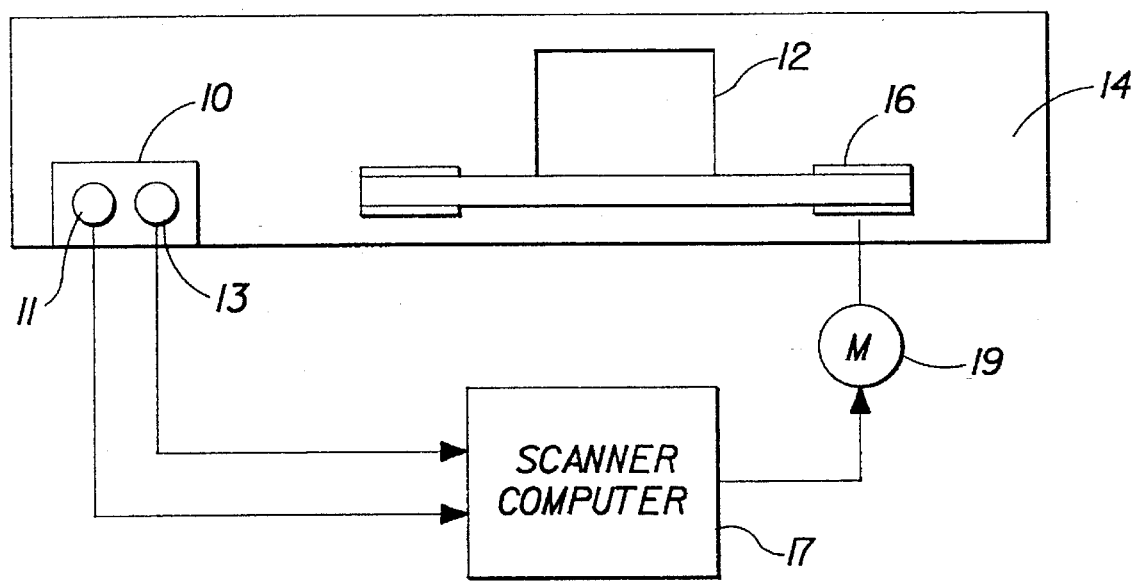
FIG. 1 is a schematic illustration of the layout of the quadrature-type perf sensor with respect to the filmstrip drive and scanning aperture of the Model 2400 film scanner.
Figure 2:
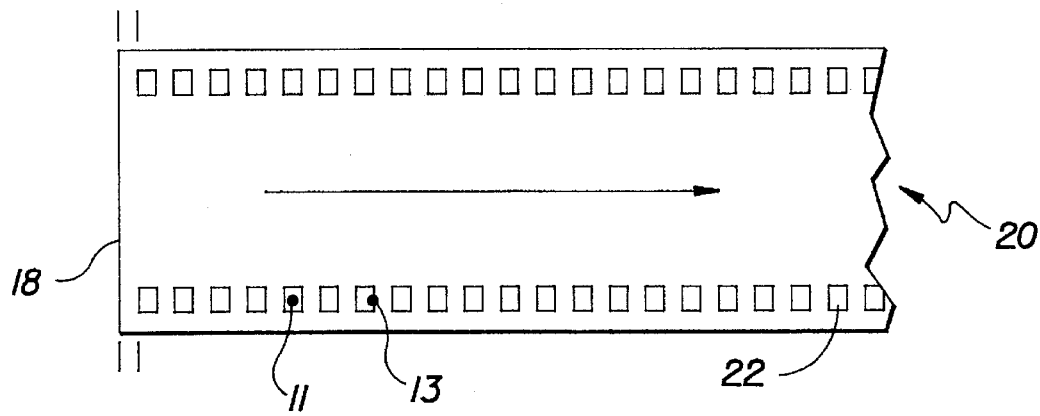
FIG. 2 is an illustration of the "Normal" trailing edge of a severed negative filmstrip.
Figure 3:
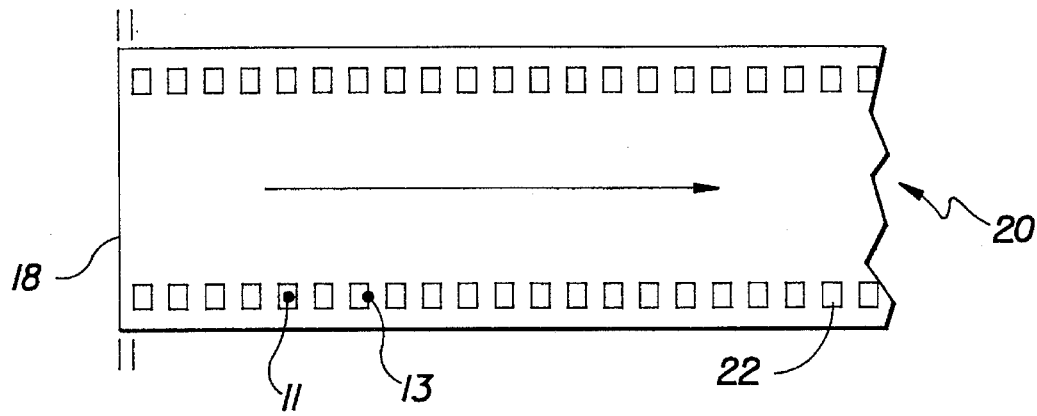
FIG. 3 is an illustration of the "Trimmed" trailing edge of a severed negative filmstrip.
Figure 4:
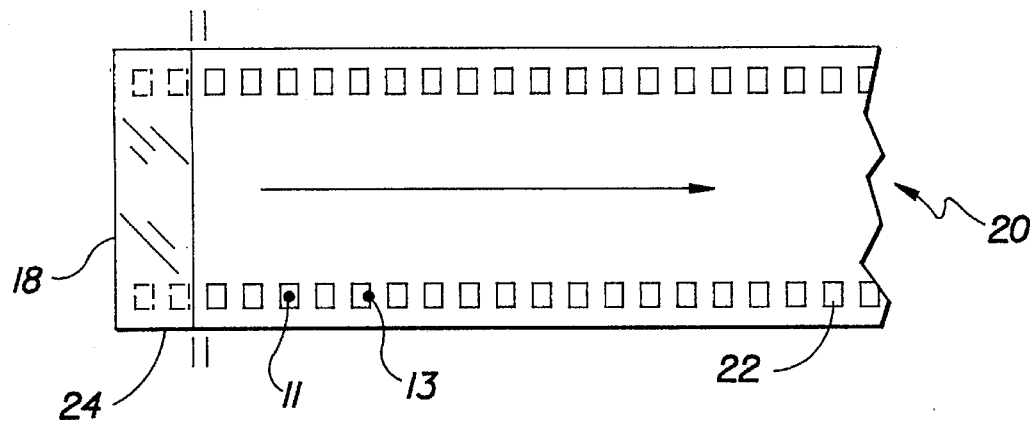
FIG. 4 is an illustration of the "Spliced" trailing edge of a severed negative filmstrip.
Figure 5:
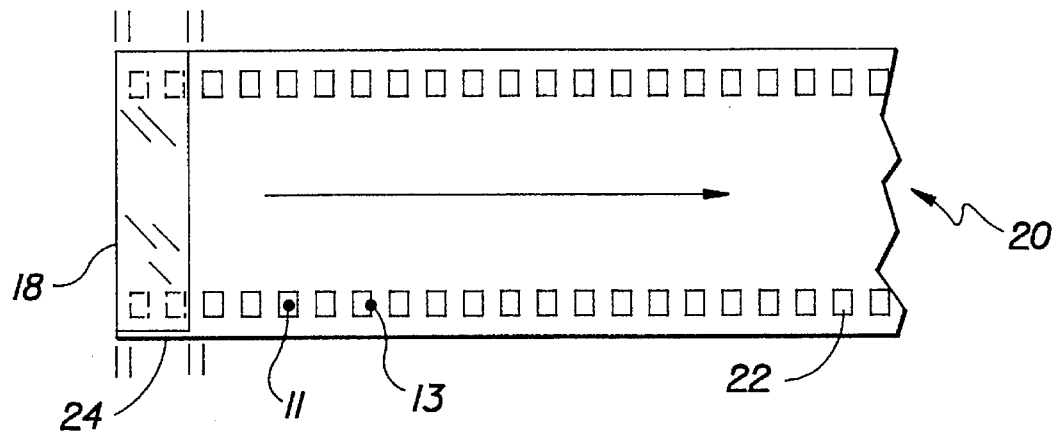
FIG. 5 is an illustration of the "Spliced & Trimmed" trailing edge of a severed negative filmstrip.
Figure 6:
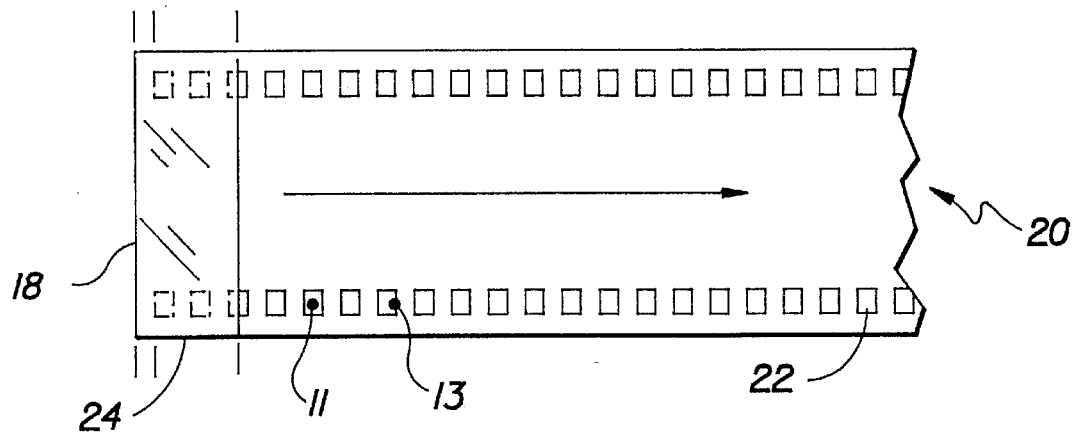
FIG. 6 is an illustration of the "Spliced" trailing edge of a severed negative filmstrip with a partially covered perf.
Figure 8:
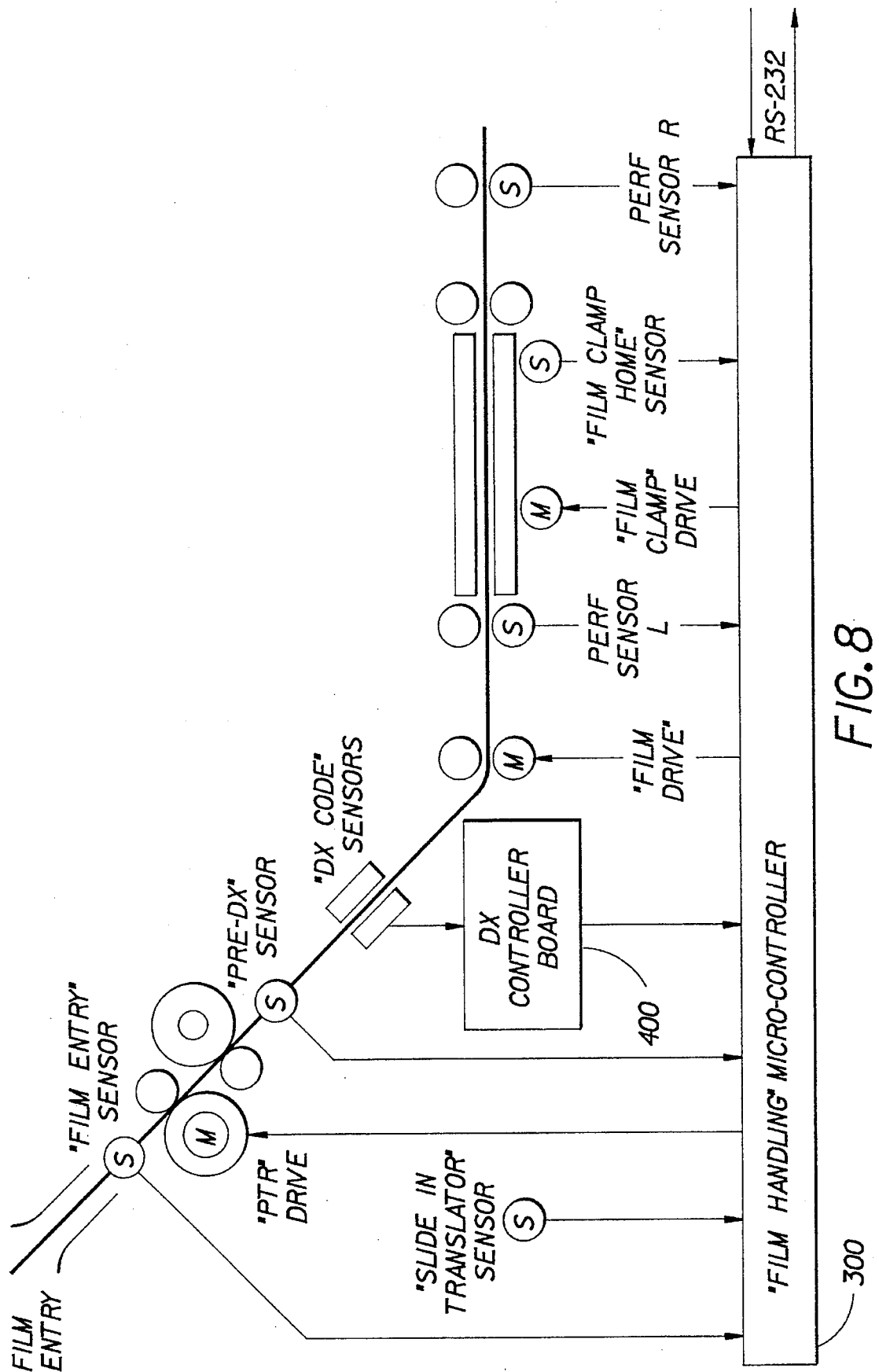
FIG. 8 is a schematic illustration of the inter-connection of the film handling micro-controller with components of the film scanner.

FIG. 8 is a system electro-mechanical block diagram of the inter-connection of the film handling micro-controller 300 with the motors and sensors described below for processing perf sense pulse trains "PERF_A" and "PERF_B" and half-step motor drive pulses and the scan line number received on the RS-232 interface from a film scanning micro-controller 350 (shown in FIGS. 9–11) in accordance with operating algorithms described below. FIG. 8 corresponds to FIG. 1 of the above referenced U.S. patent application Ser. No. 201,282, incorporated herein by reference, which also describes the film scanning micro-controller in detail. For purposes of the present invention, it is sufficient to state that the scanner computer includes the film handling micro-controller 300 for controlling filmstrip handling operations, the film scanning micro-controller 350 for controlling various operations of the scanning station and carriage, and a further latent image bar code (LIBC) or "DX Controller Board" 400 handling operations of the "DX Code Sensors" or LIBC reader. The various motors ("M") and sensors ("S") controlled by and from which signals are derived, respectively, are labelled as shown in FIG. 8 are described hereafter to the extent that they play a role in the operations described.

The scanner computer is coupled to an external computer through an SCSI interface with the film scanning micro-controller 350. The operator may enter information on the external computer keyboard related to a filmstrip order to be scanned, including the image frame numbers to be scanned, and the like. The operator also may enter a scanning command for scanning individual slides. The operator may view the results of the pre-scan as a video display image on the monitor and enter color balance, density, scene rotation, and decide which images to main-scan or to eject the filmstrip.

The film handling micro-controller 300 shown in FIG. 8 includes a micro-processor operating under resident software which responds to sense and status signals from the various sensors S and provide motor control signals for the stepper drive motors M associated with the filmstrip handling apparatus. The film handling micro-controller responds to an output of the "Film Entry Sensor" indicating the leading end entry of a filmstrip by applying motor drive commands to the "PTR Drive" motor. The filmstrip is transported by the PTR roller assembly through a "Pre-DX" filmstrip end detector and the film handling micro-controller 300 enables the LIBC controller board 400 to read the bar code.

The LIBC controller board 400 receives commands from the film handling micro-controller 300 when a filmstrip is entering the LIBC reader assembly ("DX Code Sensors") to initiate LIBC reading. The LIBC readings are decoded by the LIBC controller board and provided as DX data to the film handling micro-controller 300. The decoded DX data is transferred to the film scanning micro-controller 350 on the RS-232 interface for transmission to the external computer.

The filmstrip is advanced into the filmstrip clamp and scanning gate, where left and right filmstrip drive roller assemblies are coupled to the "Film Drive" bi-directional stepper motor M. The film handling micro-controller 300 provides the stepper drive pulses to advance the filmstrip in forward and reverse directions through or into and from the scanning station during pre-scanning and main-scanning operations.

The film handling micro-controller 300 also receives the PERF_A and PERF_B pulse trains from the respective left and right perf sensors S. The filmstrip clamp and scanning gate also includes a "Film Clamp" drive motor M energized to clamp the filmstrip image frames in the scanning station and receives a "Film Clamp Home" signal S to ensure that the film clamp is released to advance the filmstrips through the filmstrip scanning gate.

Information as to the scanning gate frame and integrator positions and the status of slide and filmstrip scanning is also provided from the film scanning micro-controller 350 to the film handling micro-controller 300 on the RS-232 interface in order to prompt the next filmstrip drive operation during main-scanning operations.

Both the pre-scan and main-scan data are transferred via the SCSI interface to the external computer. The pre-scan data is analyzed by a frame line detection algorithm (FLDA) to determine the location of all the images on a film strip in terms of the pre-scan line number.

As shown in FIGS. 9–11, the film scanning micro-controller 350 is coupled with the tri-color CCD linear array 134 to provide line scan clock signals to the array to clock out the charge signals. During the pre-scan operation, the line scans are numbered, and the pre-scan line numbers are provided on the RS-232 interface to the film handling micro-controller for developing position data as described below.

Turning now to the film handling operations for filmstrip scanning illustrated in FIGS. 9–11, the scanner housing 101 is depicted in part in FIG. 9 to show the slide input/output slot 121 and separate filmstrip input slot 141 and output slot 161. The operator enters the type of film and other information on the keyboard, and, if necessary, the film scanning micro-controller positions the respective scanning gate 281 or 221 inside the housing 101 into position to receive and initiate scanning of the slide or filmstrip. After scanning is completed, slides are returned in slide scanning gate 281 to the slide input/output slot 121 to be manually withdrawn, and filmstrips are ejected from filmstrip output slot 161.

FIGS. 9–11 depict the film scanning plane 130 between the upper and lower clamp elements 76, 78, the scanning lens system 132, and the tri-color CCD linear array 134 that form the stationary film scanning station. The film scanning station includes the light integrator assembly 40 for providing a linear light beam onto a film scanning plane 130 through the light conducting bar 44, so that the light beam is modulated in color and intensity by the film image frame positioned in the film scanning plane 130 by the filmstrip or slide scanning gates. The CCD linear array 134 of light responsive CCD elements converts the modulated linear light beam into line scan electrical signals under the control of the film scanning micro-controller 350. The scanning lens system 132 focuses the modulated line of light onto the scanning array 134 as the film image is advanced through the image scanning plane 130 in the pre-scan and main-scan operations, employing the auto-focus system to make fine adjustments in focus, if necessary.

Each of the major components of the elongated scanning gate frame 201, i.e. the filmstrip clamp and scanning gate 221, the take-up chamber 241, the diverter 261 and the slide scanning gate 281, are depicted in respectively labelled blocks, and the frame 201 is in a filmstrip scanning position adjacent the left limit sensor 138. The light integrator housing 42 and light bar 44 are in the scanning position for scanning negative filmstrips in the image plane 130.

In FIG. 9, a previously scanned filmstrip 120 is depicted exiting down exit chute 15 and out the filmstrip exit slot 161 as the next filmstrip 122 to be scanned is being advanced by the PTR rollers 53–56 in the PTR assembly 50. Prior to that advancement, the trailing end of the previous filmstrip 120 was driven left by the drive roller assemblies 62 and 64 (shown in FIG. 12) until its trailing end passed left of the left perf sensor assembly 84. The film handling micro-controller 300 responded to the last detected perf sense pulse of the left perf sensor photo diode 92 and delivered a set number of stepper drive pulses to the stepper motor for the drive roller assemblies 62 and 64 to ensure that the filmstrip 120 was completely ejected.

The presence of the filmstrip 122 was detected earlier by a film entry sensor (not shown in FIGS. 9–11). In response, the film handling micro-controller 300 determined that the previous filmstrip 120 had exited the filmstrip scanning gate by detecting its trailing end and providing the set number of step pulses to the filmstrip drive motor assemblies operating in the reverse direction as described above. Then, the film handling micro-controller 300 began to provide stepper drive pulses to the PTR drive assembly 50, as well as the stepper drive motor for the drive roller assemblies 62 and 64, in the forward direction and lowered (or confirmed the lowered position of) the film clamp members 76 and 78. The filmstrip 122 was advanced by the PTR drive rollers through a further sensor (not shown) which enables the LIBC reader controller 400 (FIG. 8) to commence LIBC reading.

As shown in FIG. 9, the filmstrip 122 has been advanced until its pre-scan leading end pushed flipper 100 down from its normal up position, entered the nip between the drive rollers 66 and 68, and approached the left perf sensor LED 88 and photo diode 92. When the first pre-scan leading end sprocket hole reaches the left perf sensor photo diode 92, the resulting perf signal is applied to the filmstrip handling micro-controller 300 which in response stops delivering stepper drive pulses to the PTR roller assembly 50 drive motor.

Turning to FIG. 9, left drive rollers 66, 68 and right drive rollers 70, 72 continue to be rotated to advance the filmstrip 122 to the right, so that the leading end is directed into the cavity of the take-up chamber 241. The drive roller assemblies continuously advance the negative filmstrip 122 to the right during the pre-scan of the image frames at a relatively high speed, with the film clamp members 78 and plate 76 dis-engaged.

When the pre-scan leading end of the filmstrip 122 is sensed by the left perf sensor assembly generating the PERF_A pulse train, the leading edge detect signal is communicated to the film scanning micro-controller 350. The line scanning by the CCD array 134 is enabled to commence pre-scan operations before the first image frame enters the scanning station. During the continued advancement of the filmstrip 122 into the take-up chamber 241, the low resolution, pre-scan data is collected for each image frame by the tri-color CCD linear array 134.

The pulse train generated by the left perf sensor photo diodes 92 is employed to determine when the pre-scan trailing end of the filmstrip 122 is positioned between the drive rollers 70 and 72 and the drive roller stepper motor is to be halted. Half-step pulses provided by the film handling micro-controller 300 to the drive roller stepper motor are ceased a set number of stepper drive motor half-step pulses after cessation of the perf pulses of the left photo diode 92. It is desirable to halt filmstrip advance with the trailing end so positioned so that the filmstrip 122 is in position to be driven in the reverse direction by rollers 70 and 72 during the main-scan.

FIG. 11 depicts the motion of the filmstrip 122 in the reverse direction to position each image frame in the filmstrip clamp and scanning gate 221 for the main-scan. During pre-scan, the image frames were scanned from left to right as the image frames were advanced to the right through the film scanning plane 130. During main-scan, the direction of movement of the filmstrip 122 is reversed to the left, so that the pre-scan filmstrip trailing end becomes the main-scan filmstrip leading end. The flipper 100 of diverter 261 previously moved upward to the film eject position under its own weight so that the filmstrip 122 may be ejected in the reverse direction. The main-scanned filmstrip 122 is ejected, main-scan leading end first, downward into the chute 15 through the slot formed by the lower surface of flipper 100 and the facing surfaces of the lower film guide 128. Downward ejection of the main-scan leading end continues, and the filmstrip 122 is ejected through filmstrip output slot 161, an image frame at a time.

During main-scan, the filmstrip 122 is advanced a frame at a time into the filmstrip scanning aperture by reverse drive of the drive rollers 66–72 under control of the film handling micro-controller 300 employing previously stored first and second perf number vs. pre-scan line number tables to position the image frame accurately. The drive roller motor is halted and the film clamp movable frame member 78 is engaged by energization of a film clamp drive motor (not shown) with a film clamp drive signal from the film handling micro-controller 300. The carriage drive motor (not shown) is energized by pulses from the film scanning micro-controller 350 to translate the filmstrip scanning gate 221 through the scanning station from left to right during the main-scan operation to derive the high resolution line scan image data.

The auto-focus operation is accomplished with the first filmstrip image frame positioned for main-scanning. The clamped, image frame is line scanned while stationary and while operating the focus drive motor to adjust focus through the entire range of focus. The line scan image data is applied to the external computer where it is analyzed for optimum focus. The optimum focus position is provided to the scanning micro-controller for setting the focus for use in further scans of the same filmstrip.

Thus, during main-scanning, the drive rollers 66, 68 and 70, 72 are halted, and the carriage drive motor is operated by the film scanning micro-controller 350 to move the entire elongated scanning gate frame 201 through the scanning station by the image frame width. After each image frame is main-scanned, the carriage is translated to the left back to the start of main-scan position and the drive rollers 66–72 are energized to advance the filmstrip 122 in the reverse direction to position the next image frame into the filmstrip scanning gate to be main-scanned.

At the same time that main-scanning commences, the operator is alerted that the next filmstrip image frame may be inserted in the filmstrip input slot 141. The next filmstrip 142 is inserted and staged by the PTR assembly 50, as shown in FIG. 11, to be advanced after the previously scanned filmstrip 122 is completely ejected as described above with respect to FIG. 9.

The actual mechanical configuration of these aspects of the film scanner is further described in the above-referenced applications, particularly the U.S. patent application Ser. No. 201,282 FIGS. 12 and 13 illustrate the mechanical configuration of the perf sensors in that context.

FIGS. 12 and 13 depict the positioning of the perf sensor assemblies 84 and 86 in the scanning gate 221 in relation to the left and right filmstrip drive roller assemblies 62 and 64. The drive roller assemblies 62 and 64 are located on either side of the filmstrip scanning gate aperture 36 in the filmstrip aperture frame 38 which is attached at either end to the other components of the scanning gate frame. Only the upper left filmstrip drive roller 66 is exposed for view in FIG. 12, and it is shown comprising a compliant pair of roller surfaces spaced apart to form nips with matching roller surfaces of the lower left drive roller 68. The drive roller assemblies 62 and 64 are axially mounted to the carriage 30 for rotation by a timing belt (not shown) driven by a stepper drive motor (not shown) supported within the carriage 30.

FIG. 13 is also simplified for ease of viewing the perf sensor assemblies 84 and 86 by the removal of the plate 76 and the movable clamping elements 78, which are specifically disclosed in the above-referenced U.S. patent application Ser. No. 167,643 and by the removal of a left printed circuit board for the left perf sensor assembly 84. The left photo diode 92, normally supported by the left printed circuit board, is exposed for view positioned above an opening in the gate aperture frame 38 through which light from the left LED (LED 88 in FIGS. 9–11) is emitted. It is to be noted that the positions of the LEDs and photo diodes above and below the film track are reversed from the schematically illustrated positions of FIGS. 9–11.

The right perf sensor assembly 86 includes the right printed circuit board 98 which supports photo diode 94 above the right LED 90 within the gate aperture frame 38. FIG. 13 depicts the right perf sensor assembly 86 in cross-section along the section line A—A in FIG. 12. In FIG. 13, the right LED 90 is fitted in an aperture in the gate aperture frame 38 and aimed to emit light through a narrow opening 96 in the frame 38 at the path of travel of the perfs 22 in filmstrip 20 in the film track 28. On the other side of the filmstrip 22, the right photo diode 94 is positioned on the right printed circuit board 98 which is coupled by flexible cable to an interface with the film handling micro-controller. The left perf sensor assembly 84 is constructed in the same fashion.

Returning to the pre-scan operation, pre-scanning of image frame data is accomplished at a line scanning rate of 583 lines per second set by the film scanning micro-controller 350. Each pre-scan line is given a line scan number that is provided to the film handling micro-controller 300. The film handling micro-controller 300 provides the filmstrip roller drive motor half-step pulses at a rate of 2102 per second. The half-step pulses are generated asynchronously with respect to the line scans. Thus, approximately 3.6 half-step pulses occur in the time that a single line scan occurs. In this fashion, the film is advanced 0.18 mm for each scan line.

During the pre-scan operation, the left and right perf sensor photo diodes 92 and 94 generate the left and right PERF_A and PERF_B pulse trains that are applied to the film handling micro-controller 300. In the pre-scan direction, the left pulse train leads the right pulse train by the number of filmstrip perfs that fall in the distance between the photo-diodes 92 and 94 as shown in FIGS. 14–17. Conversely, when the filmstrip is advanced in the reverse, main-scan direction, the right pulse train leads the left pulse train.

The pulses of the first and second perf detection pulse trains recur at a lower frequency, given the 4.75 mm spacing between leading edges of adjacent sprocket holes, than the pre-scan lines or the half-step motor drive pulses. Each pulse has a high level or state when no film or a sprocket hole perf is present and is separated by a low level or state.

At the time that pre-scan operations start, the film handling micro-controller 300 commences an algorithm for storing positional data correlating drive roller assembly stepper pulses (referred to alternatively as half-step pulses) with the pre-scan line numbers and the left and right perf sensor pulse trains. The film handling micro-controller 300 stores the perf sensor states separately for each perf sensor at each drive motor half-step in a pre-scan_a_array and a pre-scan_b_array and also correlates the drive motor half-steps to pre-scan line numbers in a further array as described in detail below.

During main-scanning, coarse and fine re-positioning steps are taken to center each image frame in the scanning aperture of the filmstrip scanning gate employing the array data also as described below.

FIGS. 14–17 are pulse train waveform diagrams of the PERF_A and PERF_B pulse trains generated by the two perf sensor photo diodes 92, 94 exhibiting "normal", "slipped", "defective perf" and "jammed" signatures. FIGS. 18–22 are flow charts of various operations of the film handling micro-controller 300 for developing the pre-scan_a_array[ ]and pre-scan_b_[ ] array and for determining the fault conditions exhibited by the signatures of FIGS. 15–17.

As described above, PERF_A pulse train leads PERF_B pulse train in the pre-scan advance direction, by a number of pulses corresponding to the distance between the left and right perf sensor assemblies 84 and 86, as shown in FIGS. 14–17. Similarly, the PERF_B pulse train leads PERF_A pulse train when the filmstrip is advanced in the reverse direction to position an image frame for the main-scan translation. The leading edges of the PERF_A and PERF_B pulse trains may be out of phase as shown in FIGS. 14–17 or may be in phase. The leading edge of each pulse is generated as the perf opening leading edge passes between the respective LED and photo diode.

It should be noted that the pulses of FIGS. 14–17 are schematic. The width of the pulse high state compared to the low state is not equal in practice, since the ANSI film perf specifications recite different widths for the perf opening and the distance between perf openings. It should also be noted that in practice, the PERF_B pulse train in practice has fewer pulses than the PERF_A pulse train because filmstrip advance is halted with the filmstrip trailing end in the nip of the right roller assembly.

Figure 14:
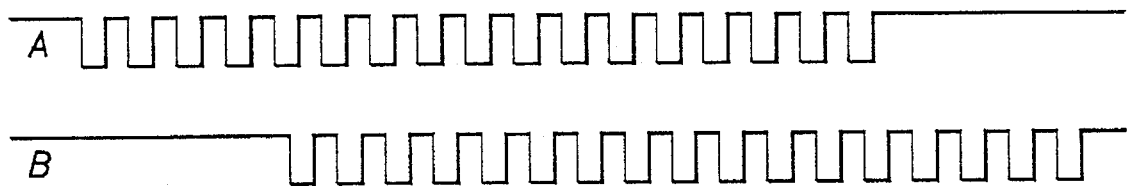
FIG. 14 is a waveform diagram of the sprocket hole sense pulse trains generated by the two perf sensors exhibiting a "normal" perf signature.

The normal filmstrip advance in the pre-scan mode results in the generation of the regularly spaced PERF_A and PERF_B pulse trains of FIG. 14, each pulse train having equally spaced pulses and equal pulse widths, reflecting a steady frequency. The regular spacing and pulse widths are reflected in the pre-scan_a_array[ ] and pre-scan_b_array[ ]. From this pattern, the film handling micro-controller 300 can determine that the filmstrip has been properly advanced fully in the pre-scan operation and proceed to the main-scan operation.

Figure 15:
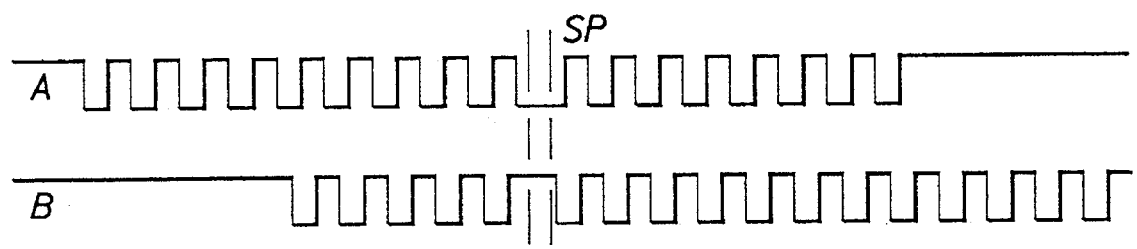
FIG. 15 is a waveform diagram of the two sprocket hole sense pulse trains generated by the two perf sensors exhibiting a "slipped" perf signature.

When slippage occurs, it slows filmstrip advance, momentarily affecting the pulse frequency or widths at the same time as shown at the slip point SP in FIG. 15. This slippage is reflected in the pre-scan_a_array[ ] and pre-scan_b_array[ ] array data at pre-scan line numbers that are similar or are common in both arrays. That relationship in the arrays can be detected by the film handling micro-controller 300 and classified as slippage so that the operator alerted to the condition. The filmstrip may be ejected so that it can be inserted and scanned again. Recurrence of the slippage with the same or a different filmstrip may indicate the need for service of the PTR or roller drive assemblies and motors.

When adjacent torn perfs are sensed as a single wide perf, the PERF_A and PERF_B pulse trains evidence respective wide output pulses WPA, WPB at different times, since the torn perf is later detected by the right perf photo diode 94. The wide output pulses WPA, WPB are therefore out of phase to one another by the distance between the photo diodes 92 and 94. The film handling micro-controller 300 can detect the occurrence of the wide pulses "WPA", "WPB" at pre-scan line numbers in both the pre-scan_a_array[ ] and pre-scan_b_array[ ] that differ in relation to the distance between the perf sensors. After that difference is calculated and compared to the reference difference number, the film handling micro-controller determines that the pre-scan data is not faulty and complete the main-scan operation.

Figure 16:
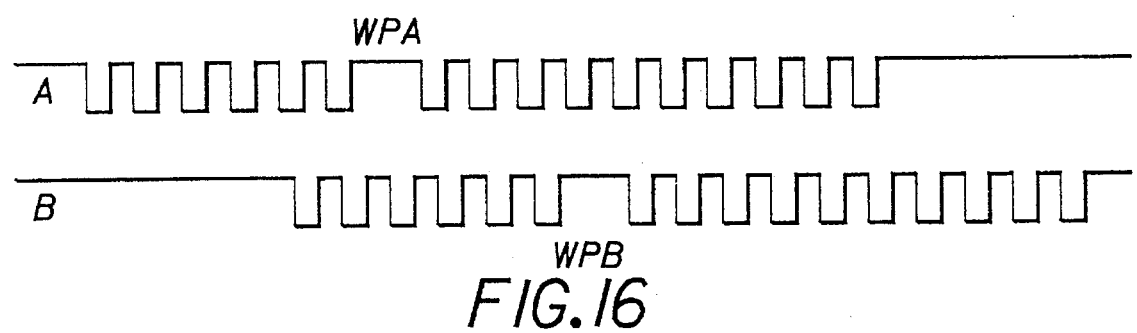
FIG. 16 is a waveform diagram of the two sprocket hole sense pulse trains generated by the two perf sensors exhibiting a "defective" perf signature.
Figure 17:
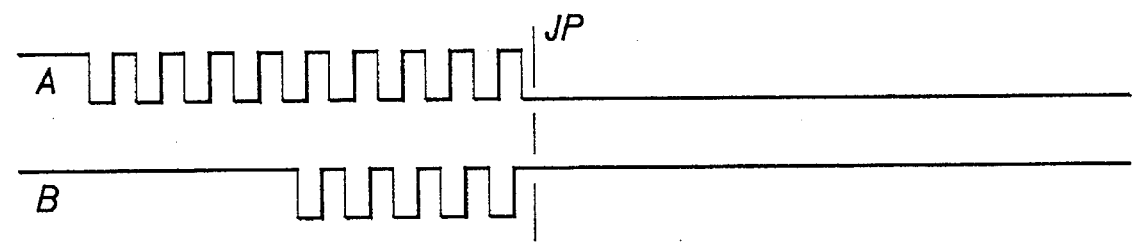
FIG. 17 is a waveform diagram of the two sprocket hole sense pulse trains generated by the two perf sensors exhibiting a "jammed" perf signature.

When a jam occurs, film transport is suddenly halted, terminating the PERF_A and PERF_B pulse trains at the same time, as shown at the jam point "JP" in FIG. 16. A jam condition may result in either a high or low state output of the perf sensors as shown at JP, and the JP occurs at the same half step pulse counts in the pre-scan a_a_array[ ] and pre-scan_b_array[ ]. The film handling micro-controller 300 can detect that relationship in the manner described hereafter. The operator is alerted to open the access door and manually remove the jammed filmstrip and obtain appropriate service, if jamming repeats.

Figure 18:
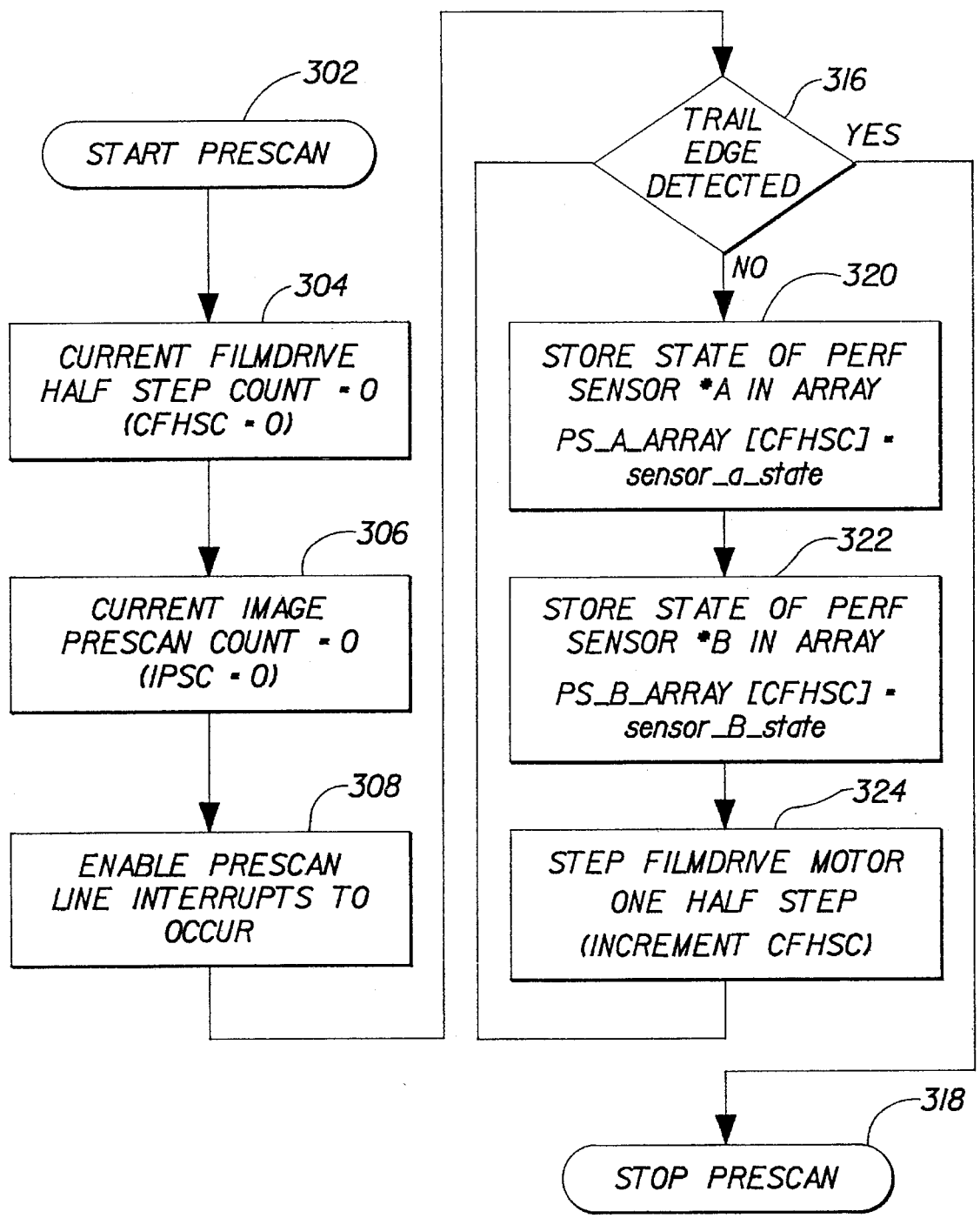
FIG. 18 is a flow chart of the steps of storing pre-scan filmstrip perf and half-step motor drive pulse numbers as arrays during the pre-scan operation.
Figure 19:
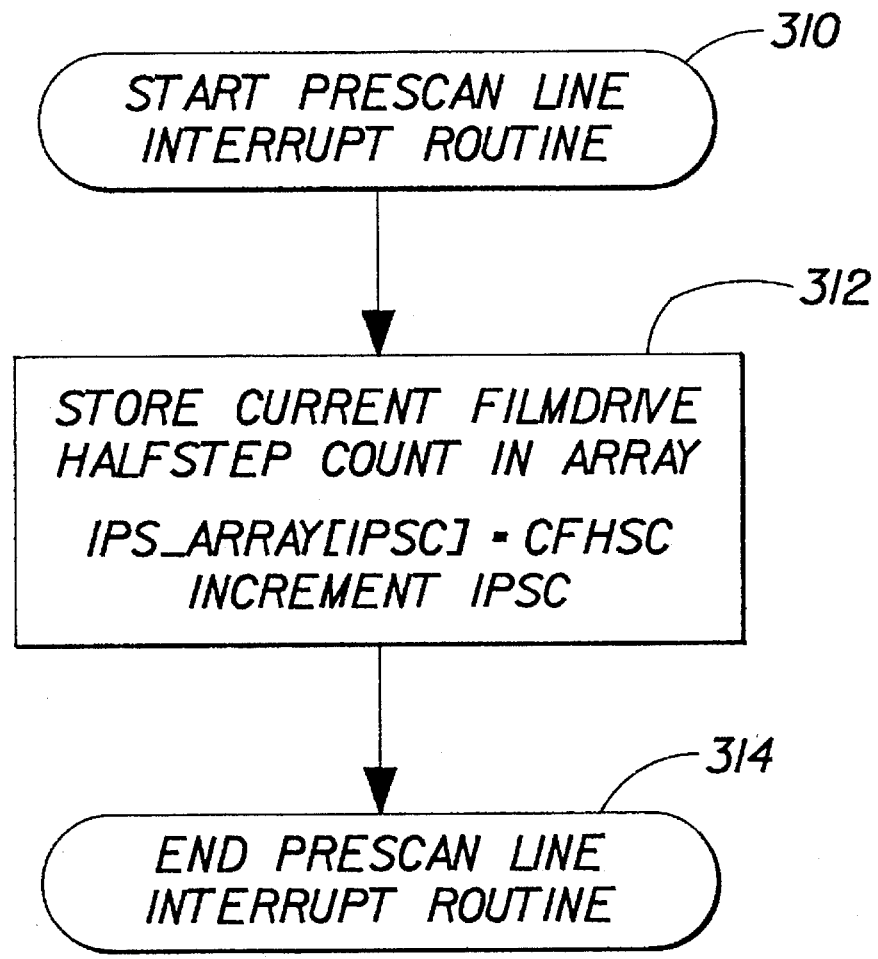
FIG. 19 is a flow chart of the interrupt routine for storing pre-scan line numbers with respect to half-step motor drive pulse numbers as an array during the pre-scan operation.

Turning now to the method for deriving the pre-scan _a_array[ ] and pre-scan_b_array[ ] arrays, FIGS. 18 depicts the steps of storing the position data in the arrays during pre-scan. At this point, a filmstrip to be pre-scanned is advanced to the first perf sensor as described above in reference to FIG. 9. The command to advance the pre-positioned filmstrip by the PTR and film drive roller assembly stepper motors triggers the pre-scan. Upon reception of a pre-scan command START PRESCAN in block 302, the current film drive half-step count (CFHSC) and current image pre-scan count (IPSC) are set to zero in blocks 304 and 306. In block 308, the pre-scan line interrupt routine of FIG. 19 is enabled.

Jumping to the pre-scan line interrupt routine at block 310, each pre-scan line generated in the film scanning micro-controller 350 increments the IPSC and stores the CFHSC in the pre-scan_table[ ] array as shown in block 312. Then the pre-scan line interrupt routine is exited in block 314. Since pre-scan line interrupts occur asynchronously to the other interrupts, servicing of the interrupts continues as the CFHSC and PERF states are processed in FIG. 18.

It should be noted that the pre-scan image data obtained during pre-scan of the entire filmstrip is applied to the external computer to conduct an image frame analysis which, among other things, results in the detection of the IPSC numbers at the borders of adjacent image frames and the trailing edge of the filmstrip. Both are detectable readily from the uniform pixel scan line data. Thus the IPSC numbers for frame boundaries and filmstrip trailing edge are tagged and used in main-scan and in ending pre-scan, respectively.

Returning to FIG. 18, the trailing edge detection state is tested in decision block 316. If present, pre-scan operations are halted in block 318. At the outset, the trailing edge detect result would be negative as the filmstrip is yet to be pre-scanned. If not present, then the pre-scan_a_array[ ] and pre-scan_b_array[ ] are modified in blocks 320 and 322. The film drive stepper motor half step pulse is then generated and CFHSC is incremented in block 324.

The trailing edge detect is tested again in block 316 and the steps are repeated, incrementing the CFHSC as half step pulses are generated and the IPSC as pre-scan lines are generated as interrupts, and the three arrays are filled. At each motor step, the film handling micro-controller records the PERF_A and PERF_B pulse levels in the pre-scan_ a_array[ ] and pre-scan_b_array[ ]. At each pre-scan line interrupt, the micro-controller records the film drive motor step count in the ips_array [IPSC].

Figure 20:
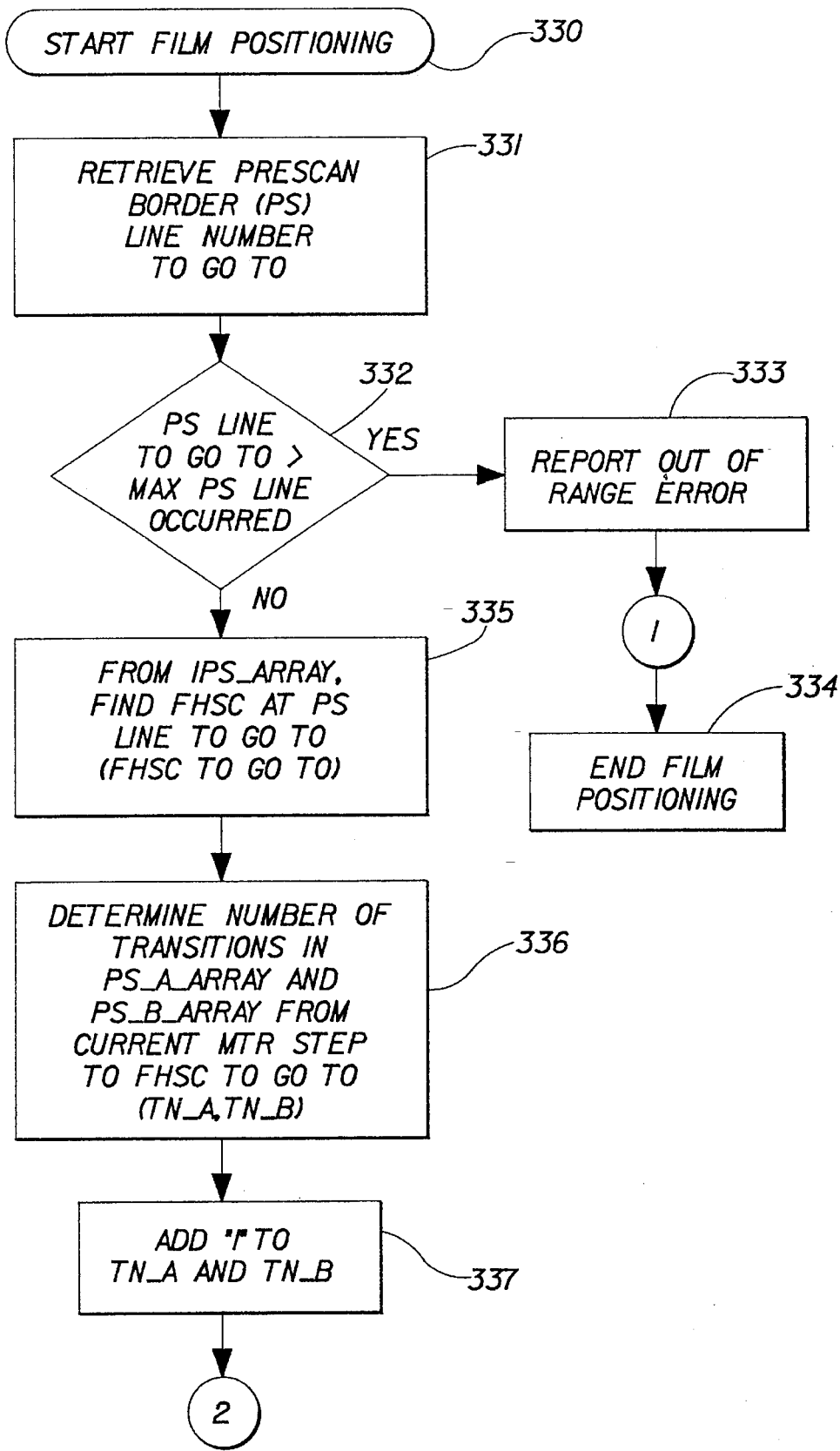
FIGS. 20 and 21 are a flow chart of the filmstrip positioning steps for positioning image frames in the main-scan using the arrays of FIGS. 18 and 19.
Figure 21:
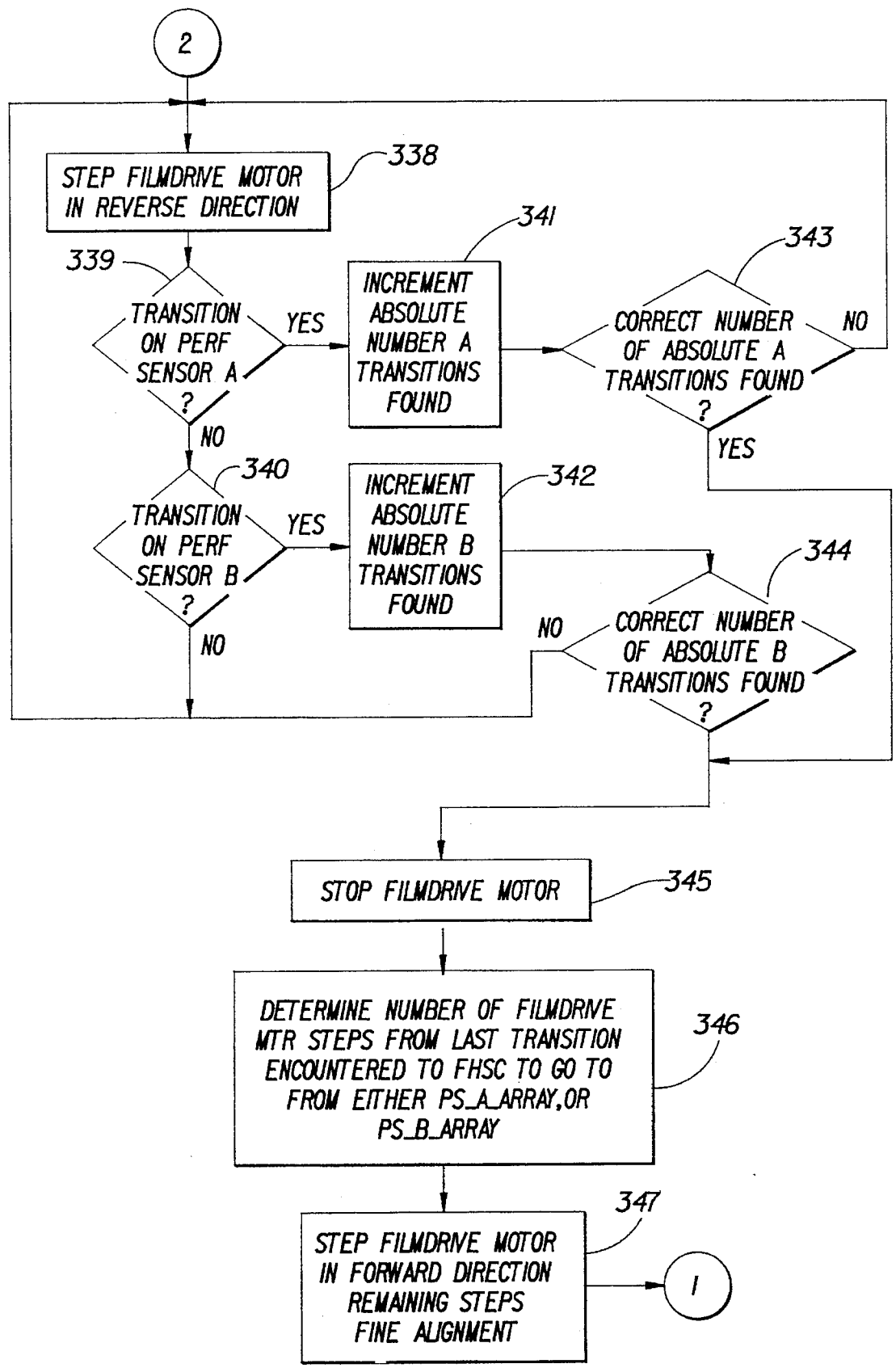

Alignment of the image frames for high resolution main-scanning is performed following the steps of FIGS. 20 and 21. A coarse alignment is first performed to the nearest perf. A fine alignment is then performed using motor steps from the nearest perf.

At the outset after film positioning is started for each image frame in block 330, the pre-scan (PS) line number of the image frame border is specified as the PS LINE TO GOTO in block 331. It is compared to the maximum PS line recorded in the pre-scan in decision block 332, and if a greater PS LINE TO GOTO is specified, a system fault has occurred. The out of range error is reported in block 333 and the film positioning attempt is ended in block 334.

If the PS LINE TO GOTO is in order, then coarse alignment proceeds as follows. The film handling micro-controller 300 uses the motor step vs. pre-scan line array from block 320 (ips_array[IPSC]) to find the motor corresponding in time step at which this image frame border pre-scan (PS) line was found in the analysis of the pre-scan image frame data by the external computer The perf vs. motor step arrays (pre-scan_a_array[ ] and pre-scan_b_array[ ]) are then scanned from the current motor step (CFHSC) to the desired motor step (FHSC TO GOTO) and transitions are counted for both perf A and B sensors in block 336. The pre-scan transition counts TN_A and TN_B are incremented by "1" in block 337 to ensure that the coarse alignment will overshoot the film image frame border and position in the scanning gate aperture for fine alignment.

Turning to FIG. 21, the coarse and fine alignment starts in block 339 by switching the stepper drive motor into reverse and applying half-step pulses as the perf sensor signal states are monitored in decision blocks 339 and 340. At each detected state transition of each PERF_A and PERF_B pulse, a main-scan transition count is incremented in the respective counter block 341 and 342. The main-scan PERF_A and PERF_B transition counts are compared to the incremented pre-scan transition counts TN_A+1 and TN_B+1 in decision blocks 343 and 344, respectively.

The filmstrip movement in the reverse direction continues until at least one of the main-scan PERF_A and PERF_B transition counts is equal to the incremented pre-scan transition counts TN_A+1 and TN_B+1 as found in decision blocks 343 and 344, respectively. The film drive half-step pulses are halted in block 345.

Fine alignment proceeds as follows. The perf vs. motor step arrays (pre-scan_a_array[ ] and pre-scan_b_array[ ]) are then examined to determine the number of half steps from the current perf transition to the desired motor half step count in block 346. The film advance motor is then driven in the forward direction this number of half-steps and the current step counter is updated to the desired motor step count in block 347.

The focusing and main-scan translation of the scanning gate frame through the scanning station is completed in the manner described more completely in the above-referenced U.S. patent application Ser. No. 201,282. The method set forth in FIGS. 20 and 21 is carried out by the film handling micro-controller for each image frame of the filmstrip to be main-scanned.

The positioning of the perf sensors on either side of the scanning gate frame allows this method of alignment of the image frames to take place. The filmstrip never leaves both of the sensors during main-scan re-positioning and the sensors allow the development of the pre-scan arrays for use in that re-positioning. The accuracy of main-scan alignment is independent of the manner in which the filmstrip leading edges are trimmed as described above with respect to FIGS. 2–7. The perf sensors and pre-scan arrays also allow fault detection as described hereafter.

Detection of slippage during a pre-scan operation is vital due to the image distortion incurred and its detrimental effect on the external computer's frame line detection algorithm. Slips are differentiated from perf defects by comparing the perf state transitions in the pre-scan_a array[ ] in comparison to the pre-scan_b_array[ ]. Slips and jams will appear aligned in the arrays while perf defects that may be ignored will appear offset by the sensor separation as described above with respect to FIGS. 15–17.

Because of the perf width and spacing described above and the distance of movement of the filmstrip in response to a half step applied to the film drive roller assembly stepper motor, approximately 93 half step pulses are delivered in the width of a perf. Torn or damaged perfs may be found if a sequence of about 95 half step pulses in the CFHSCs in the pre-scan_a_array[ ] show a high state and the same sequence appears in the pre-scan_b_array[ ] at a difference in CFHSC corresponding to the distance between the left and right perf sensors, which may be about 16 perfs in practice. Thus, torn or damaged perfs may be distinguished from slips where the widened sequence of more than 95 half step pulses of the same high state may occur in the pre-scan_a_array[ ] and the pre-scan_b_array[ ] at the same CFHSC.

Figure 22:
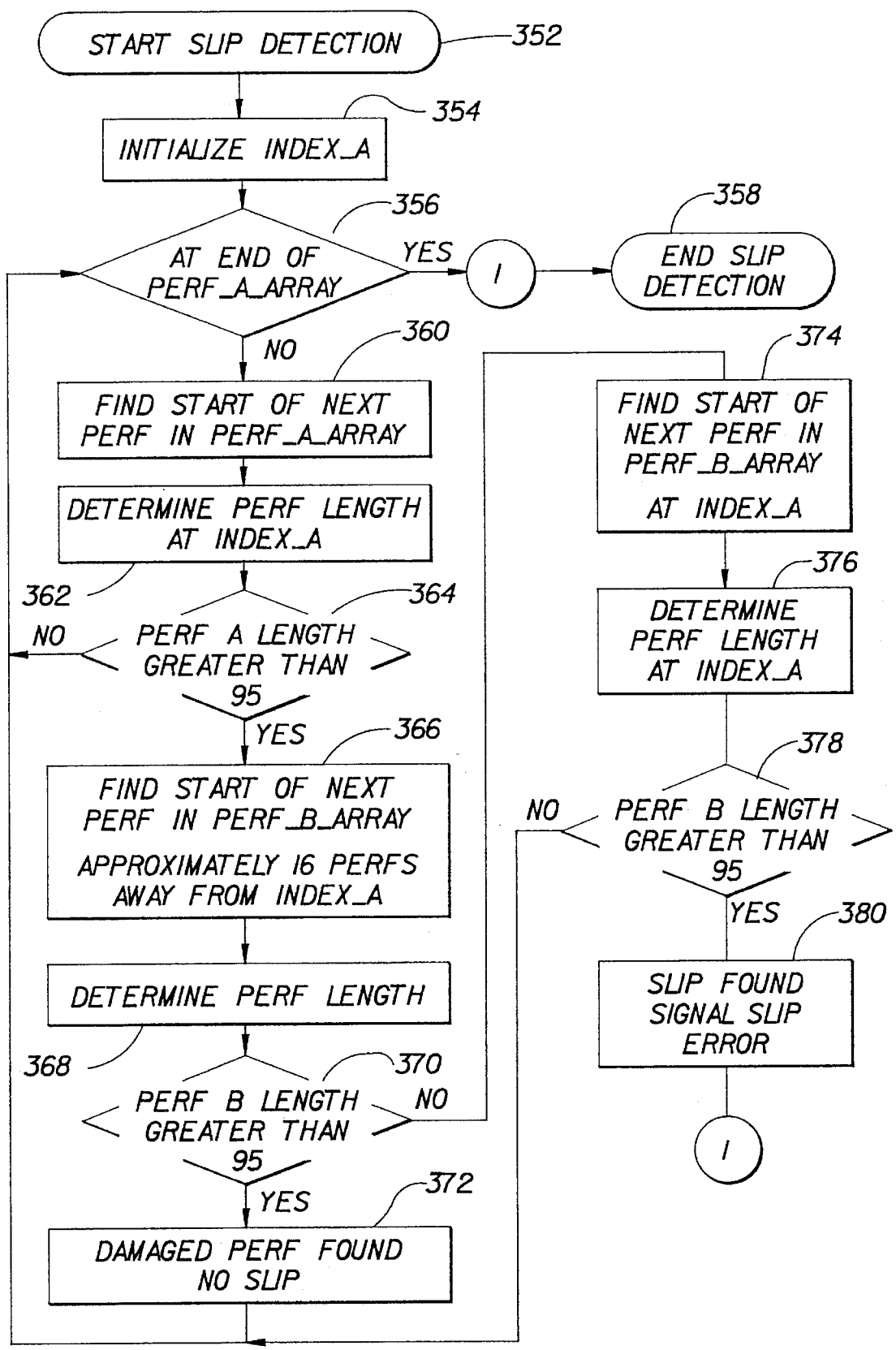
FIG. 22 is a flow chart of the slip detection examination of the arrays of FIG. 18.

The slip detection method set forth in FIG. 22 is commenced at the end of pre-scan at block 318 of FIG. 18 and completed prior to commencing the main-scan positioning method of FIGS. 20 and 21. At block 354 the INDEX_A is initialized which keeps track of the CFHSC being examined in the steps of the method.

At step 356 if the end of the pre-scan_a_array is tested and if found, then the slip detection routine is ended at step 358 to go to block 330 of FIG. 20. If not, then the high state transition to the next perf in the array is found in block 360. The length of the high state is determined by counting sequential high state CFHSCs in block 362. In block 364 the count is compared to 95 and if not greater (i.e., no evidence of slippage or a damaged perf), then the routine switches back to block 356 to repeat the steps of blocks 356–364. If none are found in the entire pre_scan_a_array, then slip detection is exited in block 358.

If a long count is found true in block 364, then the pre-scan_b_array is examined in block 366 to determine if the same pattern can be found where the same perf would have passed the right perf sensor, i.e. about 16 perfs away from the left perf sensor in this case. Thus, the pre-scan_b_array state values for a CFHSC advanced by about 93 times 16 or 1488 are examined to find the start of that perf. Then the sequential number of high CFHSCs corresponding to that perf is determined in block 368 state, and that number is compared to 95 in block 370. If the number exceeds 95, then a damaged perf is determined to have caused the anomaly in the data, and the routine starts over at step 356 as described so far.

If the number determined in block 368 is not greater than 95, then the pre-scan_b_array[ ] is examined at the same INDEX_A count, in block 374 to locate the closest next high state transition representing a perf detect. The high state CFHSCs are counted in block 376, and the number is compared to 95 in block 378. If the number is less than 95, it is assumed that an error appears in the pre-scan_a_array[ ] skate data, and the routine switches back to block 356.

If the number is greater than 95, then a slip is confirmed in block 380 and slip detection is ended in block 358. The operator is alerted to the slip and the filmstrip is ejected. As mentioned above, the filmstrip may be re-inserted for re-scanning unless the film handling apparatus, particularly the drive roller assemblies require service.

Filmstrip jams may occur at several points in the transport of a new filmstrip and in the pre-scan film advance operation. A filmstrip is considered jammed if one of several conditions occurs, e.g. (1) the PTR and/or filmstrip drive roller motors are operating but the filmstrip leading edge or perforation is not detected within a predetermined number of half-step drive pulses; (2) the state of both perf sensor pulses oscillates between low and high a predetermined number of times within a predetermined number of half-step counts; or (3) the state of both perf sensor pulses is prolonged over a further predetermined number of half-step pulses.

During pre-scan filmstrip advance, after the filmstrip leading edge is detected by the pre_DX sensor (FIG. 8), the filmstrip can possibly jam as it is advanced toward the left perf sensor. This jam condition is detected if filmstrip leading edge is not detected by the first perf sensor within a further pre-determined number of PTR motor drive pulses are delivered. Similarly, the jam may occur with the leading edge between the left and right perf sensors, and this jam condition is detected if the leading edge is not detected by the right perf sensor within a further predetermined number of filmstrip drive motor half-step pulses from the leading edge detection by the left perf sensor. If either jam condition is detected by these methods, filmstrip advance drive pulses are halted, and the operator is alerted to manually withdraw the filmstrip.

By the time that the filmstrip leading edge is detected by the left perf sensor, the pre-scan_a_array[ ] and pre-scan_b_array[ ] are already being filled. If a jam occurs after the filmstrip leading edge is detected in the second perf sensor, the jam condition exhibits the characteristics (2) or (3) set forth above, and the condition is detected from the array perf states as described in (2) or (3) above. The method of FIG. 18 is followed during this period to detect such jam conditions. In condition (3), the pre-scan_a_array[ ] and pre-scan_b_array[ ] perf state data would satisfy steps 370–380.

During main-scan, filmstrip jams would exhibit conditions (2) or (3) in the pulse states of one or both perf sensors. Separate perf sensor pulse state count and main-scan motor drive half-step counts are correlated to predetermined counts by further algorithms engaged in the main-scan operation. If a filmstrip jam is detected while the filmstrip is under one of the perf sensors, the filmstrip drive half-step pulses are terminated, and the operator is again alerted to the jam condition and to manually remove the filmstrip.

The positioning of the first and second perf sensors on either side of the filmstrip scanning aperture is at 2.8 inches (63 mm) or less than the 3.0 inch (76 mm) separation between 16 perfs (i.e., less than two image frames apart). This separation contributes to the accurate main-scan repositioning of the filmstrip image frames and the detection and discrimination of all of the fault conditions described above. The particular operating algorithms for controlling the pre-scan and main-scan filmstrip drive operations and the detection of the fault conditions may vary from those disclosed in the order of steps taken or in other ways without affecting the functions and results attained.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–21 quadrature-type perf sensor 10
scanning aperture 12
sprocket hole edge detectors 11 and 13
film transport path 14
exit chute 15
drive belt 16
scanner computer 17
severed trailing end edges 18
filmstrip drive motor 19
filmstrip 20
sprocket holes 22
splicing tape 24
film track 28
carriage 30
filmstrip scanning aperture 36
aperture frame 38
light integrator assembly 40
integrator housing 42
light conducting bar 44
particle transfer roller (PTR) assembly 50
PTR upper drive rollers 53, 54
PTR lower drive rollers 55, 56
interior frame 60
left filmstrip drive roller assembly 62
right filmstrip drive roller assembly 64
rollers 66, 68 and 70, 72
drive belt 74
removable, upper aperture defining plate 76
movable lower aperture defining frame members 78
position sensor 80
dowel pin 82
left and right perf sensor assemblies 84 and 86
LEDs 88 and 90
photo diodes 92 and 94
narrow opening 96
right printed circuit board 98
flipper 100
scanner housing 101
flipper shaft 102
supports 104, 106
LIBC reader assembly 110
LED 112
printed circuit board 114
linear CCD array 116
aperture plate 118
preceding filmstrip 120
slide input/output slot 121
next filmstrip 122
upper film guide 126
lower film guide 128
film scanning plane 130
scanning lens system 132
tri-color CCD linear array 134
position sensor 138
filmstrip input slot 141
next filmstrip 142
filmstrip output slot 161
elongated scanning gate frame 201
negative filmstrip clamp and scanning gate 221
filmstrip take-up chamber 241
filmstrip diverter 261
slide scanning gate 281
film handling micro-controller 300
blocks 302–347
film scanning micro-controller 350
blocks 352–380
DX or LIBC controller board 400

We claim:

1. Apparatus for controlling the positioning of the image frames of an elongated filmstrip, having one or more image frames between leading and trailing ends thereof and a series of perforations along the length thereof, in relation to the aperture of a film scanning gate of a scanning station of a film line scanner for deriving sets of pre-scan and main-scan line data of the image frame, said apparatus comprising:

a filmstrip drive assembly for contacting and advancing said filmstrip in a forward direction along a film track through said scanning gate in a pre-scan operation and in a reverse direction to position image frames in alignment with said scanning gate aperture in a main-scan operation;

a stepper drive motor coupled to said filmstrip drive assembly and operable in forward and reverse directions by stepper drive pulses;

forward drive means for providing stepper drive pulses and operating said stepper motor in said forward direction for advancing said filmstrip in said forward direction for a predetermined number of stepper drive pulses sufficient to advance the image frames of said filmstrip through said scanning gate as said film scanner derives said pre-scan line data and to position said filmstrip trailing end in a predetermined relation to said filmstrip drive assembly;

a first perforation sensor positioned in said film track on one side of the scanning gate aperture and in alignment with filmstrip perforations of said filmstrip advanced in said film track for generating a first perf pulse train of high and low state pulses as said filmstrip leading end is advanced in said forward direction into said scanning gate;

a second perforation sensor positioned in said film track on a side of the scanning gate aperture opposite from said first perforation sensor and in alignment with filmstrip perforations of said filmstrip advanced in said film track for generating a second perf pulse train of high and low state pulses as said filmstrip leading end is advanced in said forward direction past said scanning gate, said first and second perforation sensors being spaced less than two image frame lengths apart, measured in the direction of said series of perforations; and means for comparing said first and second perf pulse trains to derive positional information regarding the location of an image frame within said scanning gate.

2. The apparatus of claim 1 further comprising:

reverse drive means for providing said stepper drive pulses and for operating said stepper drive motor in said reverse direction for advancing said filmstrip in said reverse direction to position each image frame in said scanning gate in alignment with said aperture;

means for operating said film line scanner in said main-scan operation of said image frame in said scanning gate aperture for deriving said main-scan line data.

3. The apparatus of claim 2 wherein;

said forward drive means is operable to provide said stepper drive pulses at a pulse rate exceeding the pulse rate of said first and second perf pulse trains, whereby, in the normal operation of said stepper drive motor and said filmstrip drive assembly, a first predetermined count of successive stepper drive pulses effects the movement of a single, normal width, perforation past said first and second perf sensors and the generation of a single perf pulse by said first and second perf sensors.

4. The apparatus of claim 3 further comprising:

means for numbering said stepper drive pulses provided by said forward drive means;

means for correlating each stepper drive pulse number to the high or low state of said first and second perf pulse trains in first and second pre-scan perf arrays;

means for counting successive numbered stepper drive pulses correlated to the same high or low state in each of said pre-scan perf arrays and providing state counts;

means for defining said first predetermined count of stepper drive pulses;

means for comparing said state counts to said first predetermined count to identify excess state counts; and means for determining that an identified excess state count is related to defective advance of said filmstrip in said forward direction, when said excess state count is found in both of said first and second pre-scan perf arrays related to at least a common stepper drive pulse number, and for determining that an identified excess state count is related to a defective perf of excess width in said filmstrip advanced in said forward direction, when said excess state count is found in both of said first and second pre-scan perf arrays related to a different set of stepper drive pulse numbers related to the distance apart of said first and second perf sensors.

5. The apparatus of claim 4 further comprising:

means for establishing a second predetermined number of successive stepper drive pulses during pre-scan advancement of said filmstrip past said second perf sensor; and wherein:

the numbering means, correlating means and counting means operate during advancement of said filmstrip in said forward direction;

the comparing means compares said state counts to said second predetermined number to identify a second excess state count; and said determining means is operable to identify a jammed and immobile filmstrip, when said excess state count is found in one or both of said first and second pre-scan perf arrays during said pre-scan advancement of said filmstrip.

6. The apparatus of claim 3 further comprising:

means for establishing a second predetermined number of successive drive pulses during pre-scan advancement of said filmstrip past said second perf sensor;

means for numbering said stepper drive pulses provided by said first means;

means for correlating each stepper drive pulse number to said high or low state of said first and second perf pulse trains in first and second pre-scan perf arrays;

means operable during said pre-scan advancement of said filmstrip for counting successive numbered stepper drive pulses correlated to the same high or low state in each of said pre-scan perf arrays and providing state counts;

means operable during said pre-scan advancement of said filmstrip for comparing said state counts to said second predetermined number to identify a state count in excess of said second predetermined number; and determining means for identifying a jammed and immobile filmstrip, when said excess state count is found in one or both of said first and second pre-scan perf arrays during said pre-scan advancement of said filmstrip.

7. The apparatus of claim 1 wherein;

said forward drive means is operable to provide said stepper drive pulses at a pulse rate exceeding the pulse rate of said first and second perf pulse trains, whereby, in the normal operation of said stepper drive motor and filmstrip drive assembly, a first predetermined number of successive stepper drive pulses effect the movement of a single, normal width perforation past said first and second perf sensors and the generation of a single perf pulse by said first and second perf sensors.

8. The apparatus of claim 7 further comprising:

means for numbering said stepper drive pulses provided by said first means;

means for correlating each stepper drive pulse number to said high or low state of said first and second perf pulse trains in first and second pre-scan perf arrays;

means for counting successive numbered stepper drive pulses correlated to the same high or low state in each of said pre-scan perf arrays and providing state counts;

means for defining said first predetermined count of stepper drive pulses;

means for comparing said state counts to said first predetermined count to identify excess state counts; and means for determining that an identified excess state count is related to defective advance of said filmstrip in said forward direction, when said excess state count is found in both of said first and second pre-scan perf arrays related to a common set of stepper drive pulse numbers, and for determining that an identified excess state count is related to a defective perf of excess width in said filmstrip advanced in said forward direction, when said excess state count is found in both of said first and second pre-scan perf arrays related to a different set of stepper drive pulse numbers related to the distance apart of said first and second perf sensors.

9. The apparatus of claim 8 further comprising:

means for establishing a second predetermined number of successive drive pulses during pre-scan advancement of said filmstrip past said second perf sensor; and wherein:

the numbering means, correlating means and counting means operate during advancement of said filmstrip in said forward direction;

the comparing means compares said state counts to said second predetermined number to identify a second excess state count; and said determining means is operable to identify a jammed and immobile filmstrip, when said excess state count is found in one or both of said first and second pre-scan perf arrays during said pre-scan advancement of said filmstrip.

10. The apparatus of claim 7 further comprising:

means for establishing a second predetermined number of successive drive pulses during pre-scan advancement of said filmstrip past said second perf sensor;

means for numbering said stepper drive pulses provided by said first means;

means for correlating each stepper drive pulse number to said high or low state of said first and second perf pulse trains in first and second pre-scan perf arrays;

means operable during said pre-scan advancement of said filmstrip for counting successive numbered stepper drive pulses correlated to the same high or low state in each of said pre-scan perf arrays and providing state counts;

means operable during said pre-scan advancement of said filmstrip for comparing said state counts to said second predetermined number to identify a state count in excess of said second predetermined number; and determining means for identifying a jammed and immobile filmstrip, when said excess state count is found in one or both of said first and second pre-scan perf arrays during said pre-scan advancement of said filmstrip.

11. The apparatus of claim 1 further comprising:

position data deriving means operable during pre-scanning of said filmstrip for correlating image frame pre-scan line data, said stepper drive pulses and said first and second perf pulse trains for deriving image frame position data;

reverse drive means operable during said main-scan for providing stepper drive pulses and operating said stepper motor in said reverse direction to advance each image frame of said filmstrip in the reverse direction for main-scan thereof; and main-scan re-positioning means for controlling said second drive means in response to said image frame position data.

12. The apparatus of claim 11, wherein said film scanner further comprises:

line scanning means for scanning image lines of said filmstrip advanced in said forward direction during said pre-scan advancement of said filmstrip at a predetermined line scan rate to produce a plurality of pre-scan line scans; and wherein said position data deriving means further comprises:

means for numbering each pre-scan line scan;

means for numbering said stepper drive pulses provided by said first means during said pre-scan advancement;

means for correlating said stepper drive pulse numbers with a pre-scan line scan numbers in a line scan array, whereby each pre-scan line scan number is correlated to one or more stepper drive pulse number during said pre-scan advancement; and means for correlating each stepper drive pulse number to said high or low state of said first and second perf pulse trains generated by said first and second perforation sensors in first and second pre-scan perf arrays, whereby said first and second pre-scan perf arrays define first and second perf pulse transitions from the high or the low state to the other state as stepper drive pulse transition numbers.

13. The apparatus of claim 12 wherein said main-scan re-positioning means further comprises:

means for deriving image frame border line scan numbers among the pre-scan lines of said image frames;

means for defining a start main-scan stepper drive pulse number from an end pre-scan stepper drive pulse number;

means for defining the next stepper drive pulse number to go to correlated to the next image frame border line scan number to go to from said scan line array;

means for down counting the number of stepper drive pulse transition numbers in said first and second pre-scan perf arrays from the start main-scan stepper drive pulse number through the next stepper drive pulse number to go to and to the next stepper drive transition number and deriving a perf transition count to go to in the reverse direction;

coarse image frame alignment means for operating said second drive means while counting pulse state transitions of said first and second perf pulse trains and for halting operation of said second drive means when said perf transition count to go to equals said counted perf pulse state transitions of at least one of said first and second perf pulse trains; and fine image frame alignment means for operating said first drive means while counting said stepper drive pulses until said stepper drive pulse count equals a count related to the difference in count between the next stepper drive pulse to go to and the next stepper drive pulse transition number, whereby said image frame is aligned with said scanning gate aperture for main-scanning translation of said scanning gate in said scanning station.

14. A method for controlling the positioning of the image frames of an elongated filmstrip, having one or more image frames between leading and trailing ends thereof and a series of perforations along the length thereof, in relation to the aperture of a film scanning gate of a scanning station of a film line scanner for deriving sets of pre-scan and main-scan line data of the image frame, said method comprising the steps of:

step wise advancing said filmstrip in a forward direction in a film track through said scanning gate a step at a time for a number of steps sufficient to advance all the image frames of said filmstrip through said scanning gate and positioning said filmstrip trailing end in a predetermined main-scan start position;

operating said film scanner a pre-scan line at a time to derive said pre-scan line data;

sensing perforations of said filmstrip at a first position in said film track on one side of said scanning gate aperture and generating a first perf pulse train of high and low state pulses as said filmstrip leading end is advanced in said forward direction into said scanning gate;

sensing perforations of said filmstrip at a second position in said film track on a side of said scanning gate aperture opposite from said first position and generating a second perf pulse train of high and low state pulses as said filmstrip leading end is advanced in said forward direction past said scanning gate, said first and second positions being less than two image frame lengths apart, measured in the direction of said series of perforations;

storing said first and second pulse train high and low states in reference to said step wise advancing step; and positionally comparing said stored pulse trains with said advancement steps and distinguishing a default condition in said filmstrip advancing step from a defective perf.

15. The method of claim 14 wherein the storing and positionally comparing steps further comprise:

numbering the steps of advancement of said filmstrip during the advancement of the filmstrip;

correlating each step number to said high or low state of said first and second perf pulse trains in first and second pre-scan perf arrays;

counting successive numbered stepper drive pulses correlated to the same high or low state in each of said pre-scan perf arrays and providing first and second respective perf state counts; and detecting faults in the advancement of said filmstrip and filmstrip perforation defects as a function of the length and position of said first and second perf state counts of said first and second pre-scan perf arrays.

16. The method of claim 15 wherein said detecting step further comprises the steps of:

establishing a normal perf width step count as a function of the count of steps present in sensing a normal width perforation advanced through said first and second sensing positions;

comparing said first and second state counts to said normal perf width step count to identify excessive width state counts; and determining that an identified excessive width state count is related to defective advance of said filmstrip in said forward direction, when said excessive width state count is found in both of said first and second pre-scan perf arrays correlated to a common set of step numbers, and for determining that an identified excessive width state count is related to a defective perf of excess width in said filmstrip advanced in said forward direction, when said excessive width state count is found in both of said first and second pre-scan perf arrays correlated to a different set of step numbers related to the distance apart of said first and second perf sensing positions in said film track.

17. The method of claim 16 wherein said determining step is operable to identify a jammed and immobile filmstrip, when a further excessive width state count is found in one or both of said first and second pre-scan perf arrays during said pre-scan advancement of said filmstrip through the steps of:

establishing a step count indicative of a jammed filmstrip;

counting successive steps correlated to the same high or low state in each of said pre-scan perf arrays and providing state counts;

comparing said state counts to said jammed filmstrip step count to identify a state count in excess thereof; and identifying a jammed and immobile filmstrip, when said excess state count is found in one or both of said first and second pre-scan perf arrays during said pre-scan advancement of said filmstrip.

18. A method for controlling the positioning of the image frames of an elongated filmstrip, having one or more image frames between leading and trailing ends thereof and a series of perforations along the length thereof, in relation to the aperture of a film scanning gate of a scanning station of a film line scanner for deriving sets of pre-scan and main-scan line data of the image frame, said method comprising the steps of:

step wise advancing said filmstrip in a forward direction along a film track and through said scanning gate a step at a time for a number of steps sufficient to advance all the image frames of said filmstrip through said scanning gate and positioning said filmstrip trailing end in a predetermined main-scan start position;

operating said film scanner a pre-scan line at a time to derive said pre-scan line data;

identifying pre-scan lines at image frame borders as frame border pre-scan lines;

sensing perforations of said filmstrip at a first position in said film track on one side of said scanning gate aperture and generating a first perf pulse train of high and low state pulses as said filmstrip leading end is advanced in said forward direction into said scanning gate;

sensing perforations of said filmstrip at a second position in said film track on a side of said scanning gate aperture opposite from said one side and generating a second perf pulse train of high and low state pulses as said filmstrip leading end is advanced in said forward direction past said scanning gate, said first and second positions being less than two image frame lengths apart, measured in the direction of said series of perforations;

numbering the steps of advancement of said filmstrip during said pre-scan advancement thereof;

correlating each advancement step number to said high or low state of said first and second perf pulse trains in first and second pre-scan perf arrays, whereby said first and second pre-scan perf arrays correlate first and second perf pulse transitions, respectively, from the high or the low state to the other state as stepper drive pulse transition numbers;

correlating said pre-scan border lines to said advancement step numbers to identify frame border advancement step numbers; and step wise advancing said filmstrip in the reverse direction through said scanning gate a step at a time for a number of steps sufficient to advance each image frame of said filmstrip into alignment with said scanning gate aperture, the number of steps derived from said frame border advancement step numbers and said stepper drive pulse transition numbers of the first and/or second perf pulse trains.

19. The method of claim 18 wherein said second step wise advancing step further comprises the steps of:

defining the start main-scan stepper drive pulse number from the end pre-scan stepper drive pulse number;

defining the next stepper drive pulse number to go to correlated to the next image frame border line scan number to go to;

down counting the number of stepper drive pulse transition numbers in said first and second pre-scan perf arrays from the start main-scan stepper drive pulse number through the next stepper drive pulse number to go to and to the next stepper drive transition number and deriving a perf transition count to go to in the reverse direction;

step wise advancing said filmstrip in the reverse direction through said scanning gate while counting pulse state transitions of said first and second perf pulse trains until said perf transition count to go to equals said counted perf pulse state transitions of at least one of said first and second perf pulse trains to effect a coarse alignment of said image frame with said scanning gate aperture; and step wise advancing said filmstrip in the forward direction through said scanning gate while counting said stepper drive pulses until said stepper drive pulse count equals a count related to the difference in count between the next stepper drive pulse to go to and the next stepper drive pulse transition number, whereby said image frame is aligned with said scanning gate aperture for main-scanning translation of said scanning gate in said scanning station.

* * * * *